(12) United States Patent
Takenaka

(10) Patent No.: US 12,117,123 B2
(45) Date of Patent: Oct. 15, 2024

(54) HOLDING MEMBER, INJECTION DEVICE, AND INSERTION DIRECTION GUIDE METHOD

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/147,077

(22) Filed: Dec. 28, 2022

(65) Prior Publication Data
US 2023/0243465 A1 Aug. 3, 2023

(30) Foreign Application Priority Data

Jan. 31, 2022 (JP) .................................. 2022-013029

(51) Int. Cl.
*F16B 2/00* (2006.01)
*F16N 3/10* (2006.01)
*H04N 23/50* (2023.01)

(52) U.S. Cl.
CPC ................ *F16N 3/10* (2013.01); *F16B 2/005* (2013.01); *F16C 2361/43* (2013.01); *F16D 2300/06* (2013.01); *F16N 2210/00* (2013.01); *H04N 23/555* (2023.01)

(58) Field of Classification Search
CPC ........ F16C 33/66–6685; F16C 2361/43; F16B 2/005; F16D 23/14; B05B 13/0627
See application file for complete search history.

(56) References Cited

U.S. PATENT DOCUMENTS 3,735,751 A * 5/1973 Katz ..................... A61M 1/774
  600/563
5,165,503 A * 11/1992 Hoffman .............. A61C 19/002
  433/104

(Continued)

FOREIGN PATENT DOCUMENTS

DE   10 2019 208 580 A1   3/2020
DE   10 2022 124 344 A1   6/2023

(Continued)

*Primary Examiner* — Michael R Mansen
*Assistant Examiner* — Mark K Buse
(74) *Attorney, Agent, or Firm* — Oblon, McClelland, Maier & Neustadt, L.L.P.

(57) ABSTRACT

A holding member configured to hold an injection portion and an imaging unit of an insertion portion in a state in which the injection portion and the imaging unit are arranged side by side includes an injection-portion insertion portion configured such that the injection portion is press-fitted into the injection-portion insertion portion and an imaging-unit insertion portion configured such that the imaging unit is press-fitted into the imaging-unit insertion portion. The insertion portion is configured to be inserted toward a corresponding portion in a narrow space while being gripped by an operator. The injection portion has a cylindrical shape and is provided with a fluid substance injection port at a tip end portion. The imaging unit has a cylindrical shape and is configured to capture an image including the tip end portion of the injection portion and its surrounding environment.

10 Claims, 22 Drawing Sheets

(56) References Cited

U.S. PATENT DOCUMENTS

| | | | |
|---|---|---|---|
| 2014/0058194 A1* | 2/2014 | Soletti | B05B 13/0627 |
| | | | 600/36 |
| 2014/0192179 A1* | 7/2014 | Lyons | G02B 23/2484 |
| | | | 348/84 |
| 2019/0107249 A1* | 4/2019 | Jolic | F16N 21/00 |
| 2020/0011453 A1* | 1/2020 | Allender-Zivic | F16L 3/06 |
| 2020/0072282 A1 | 3/2020 | Takenaka | |

FOREIGN PATENT DOCUMENTS

| | | |
|---|---|---|
| JP | 4327555 B2 | 9/2009 |
| JP | 2020-37949 A | 3/2020 |
| WO | 2017/203408 A1 | 11/2017 |

\* cited by examiner

HOLDING MEMBER, INJECTION DEVICE, AND INSERTION DIRECTION GUIDE METHOD

CROSS-REFERENCE TO RELATED APPLICATION

This application claims priority to Japanese Patent Application No. 2022-013029 filed on Jan. 31, 2022, incorporated herein by reference in its entirety.

BACKGROUND

1. Technical Field

The present disclosure relates to a holding member, an injection device, and an insertion direction guide method.

2. Description of Related Art

A device has been proposed in which an insertion portion (greasing pipe, or the like) inserted into a guide through hole of a guide jig fixed to a clutch housing is configured to be inserted toward a corresponding portion (portion where grease needs to be supplied from a tip end portion of the greasing pipe) (see, for example, Japanese Unexamined Patent Application Publication No. 2020-37949 (JP 2020-37949 A)).

SUMMARY

However, JP 2020-37949 A has an issue in that it cannot be applied when the guide jig cannot be fixed to a jig fixing target member such as a clutch housing, for example, when there is no space for fixing the guide jig.

The present disclosure provides a holding member, an injection device, and an insertion direction guide method that enable an insertion portion to be inserted toward a corresponding portion without using a guide jig.

A holding member according to a first aspect of the present disclosure is configured to hold an injection portion and an imaging unit of an insertion portion in a state in which the injection portion and the imaging unit are arranged side by side. The insertion portion is configured to be inserted toward a corresponding portion in a narrow space while being gripped by an operator. The injection portion has a cylindrical shape and is provided with a fluid substance injection port at a tip end portion. The imaging unit has a cylindrical shape and is configured to capture an image including the tip end portion of the injection portion and a surrounding environment of the tip end portion. The holding member includes an injection-portion insertion portion configured such that the injection portion is press-fitted into the injection-portion insertion portion; and an imaging-unit insertion portion configured such that the imaging unit is press-fitted into the imaging-unit insertion portion.

With such a configuration, the insertion portion can be inserted toward the corresponding portion without using a guide jig.

This is because the holding member realizes a guiding function.

In the first aspect, the holding member may include a first connection portion configured to connect the injection-portion insertion portion and the imaging-unit insertion portion. The injection-portion insertion portion may be a first semi-cylindrical portion configured such that the injection portion is press-fitted into the injection-portion insertion portion. The imaging-unit insertion portion may be a second semi-cylindrical portion configured such that the imaging unit is press-fitted into the imaging-unit insertion portion.

In the first aspect, the first connection portion may be a flat portion configured to connect one end portion of the first semi-cylindrical portion and one end portion of the second semi-cylindrical portion.

In the first aspect, the first semi-cylindrical portion may be a portion where first end portion of a plate is folded back into a semi-cylindrical shape. The second semi-cylindrical portion may be a portion where second portion of the plate is folded back into a semi-cylindrical shape. The first connection portion may be a plate portion between the first semi-cylindrical portion and the second semi-cylindrical portion.

In the first aspect, the holding member may include a second connection portion and a third connection portion. The injection-portion insertion portion may be a third semi-cylindrical portion configured such that the injection portion is press-fitted into the third semi-cylindrical portion. The imaging-unit insertion portion may include a fourth semi-cylindrical portion configured such that the imaging unit is press-fitted into the fourth semi-cylindrical portion and a fifth semi-cylindrical portion configured such that the imaging unit is press-fitted into the fifth semi-cylindrical portion. The second connection portion may be configured to connect the third semi-cylindrical portion and the fourth semi-cylindrical portion, and the third connection portion may be configured to connect the third semi-cylindrical portion and the fifth semi-cylindrical portion.

In the first aspect, the second connection portion may be a flat portion configured to connect first end portion of the third semi-cylindrical portion and one end portion of the fourth semi-cylindrical portion, and the third connection portion may be a flat portion configured to connect second end portion of the third semi-cylindrical portion and one end portion of the fifth semi-cylindrical portion.

In the first aspect, the third semi-cylindrical portion may be fixed to the injection portion inserted into the third semi-cylindrical portion.

In the first aspect, the fourth semi-cylindrical portion may be a portion where first end portion of a plate is folded back into a semi-cylindrical shape. The fifth semi-cylindrical portion may be a portion where second end portion of the plate is folded back into a semi-cylindrical shape. The third semi-cylindrical portion may be a plate portion between the fourth semi-cylindrical portion and the fifth semi-cylindrical portion. The second connection portion may be a plate portion between the third semi-cylindrical portion and the fourth semi-cylindrical portion, and the third connection portion may be a plate portion between the third semi-cylindrical portion and the fifth semi-cylindrical portion. The first portion of the plate may include a first biasing portion configured to bias the imaging unit inserted into the fifth semi-cylindrical portion against the fifth semi-cylindrical portion and a second biasing portion configured to bias the injection portion inserted into the third semi-cylindrical portion against the third semi-cylindrical portion.

In the first aspect, the plate may be made of synthetic resin or spring steel.

An injection device according to a second aspect of the disclosure includes an insertion portion configured to be inserted toward a corresponding portion in a narrow space while being gripped by an operator. The insertion portion includes an injection portion which has a cylindrical shape and is provided with a fluid substance injection port at a tip end portion, an imaging unit which has a cylindrical shape and is configured to capture an image including the tip end portion of the injection portion and a surrounding environment of the tip end portion, and a holding member configured to hold the injection portion and the imaging unit arranged side by side and including an injection-portion insertion portion and an imaging-unit insertion portion. The injection-portion insertion portion is configured such that the injection portion is press-fitted into the injection-portion insertion portion. The imaging-unit insertion portion is configured such that the imaging unit is press-fitted into the imaging-unit insertion portion. The injection portion is provided with an injection portion-side marking. The imaging unit is arranged at a predetermined angular position with respect to the injection portion by rotating the holding member holding the injection portion and the imaging unit with respect to the injection portion and aligning a holding member-side marking of the holding member with the injection portion-side marking.

With such a configuration, the insertion portion can be inserted toward the corresponding portion without using a guide jig.

This is because the holding member realizes a guiding function.

Also, with such a configuration, the imaging unit can be arranged at an appropriate angular position with respect to the injection portion.

This is due to the provision of the holding member that holds the injection portion and the imaging unit in a state in which the injection portion and the imaging unit are arranged side by side, and the provision of the injection portion-side marking (for example, a marking line) that matches the holding member-side marking (for example, a winding finish end portion of the holding member) of the holding member on the injection portion.

In the second aspect, the holding member-side marking of the holding member may be a winding finish end portion of the holding member.

A third aspect of the disclosure is an insertion direction guide method for guiding an insertion direction of an insertion portion. The insertion portion is configured to be inserted toward a corresponding portion in a narrow space while being gripped by an operator and includes an injection portion and an imaging unit. The injection portion has a cylindrical shape and is provided with a fluid substance injection port at a tip end portion. The imaging unit has a cylindrical shape and is configured to capture an image including the tip end portion of the injection portion and a surrounding environment of the tip end portion. The insertion portion is held by a holding member in a state in which the injection portion and the imaging unit are arranged side by side. The insertion direction guide method includes inserting the insertion portion into an opening or a notch portion provided in a partition wall between the operator and the corresponding portion, and inserting the insertion portion toward the corresponding portion while bringing the holding member of the insertion portion inserted into the opening or the notch portion into contact with at least a corner portion of the opening or the notch portion.

With each aspect of the present disclosure, it is possible to provide a holding member, an injection device, and an insertion direction guide method that enable an insertion portion to be inserted toward a corresponding portion without using a guide jig.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Before describing embodiments, an injection device (hereinafter also referred to as a greasing device) of a clutch release mechanism will be specifically described as a reference example. In addition, the present disclosure is not limited to the embodiments described below.

Reference Example

A greasing device of a reference example is used to perform low-cost and short-time inspection and grease injection maintenance for sliding failures (for example, sliding failure with increased friction, abnormal noise, and the like) caused by grease outflow from a fork grease lubrication portion in an MT clutch housing and foreign matter contamination after a manual transmission vehicle has been flooded or crossed a river.

Figure 1:
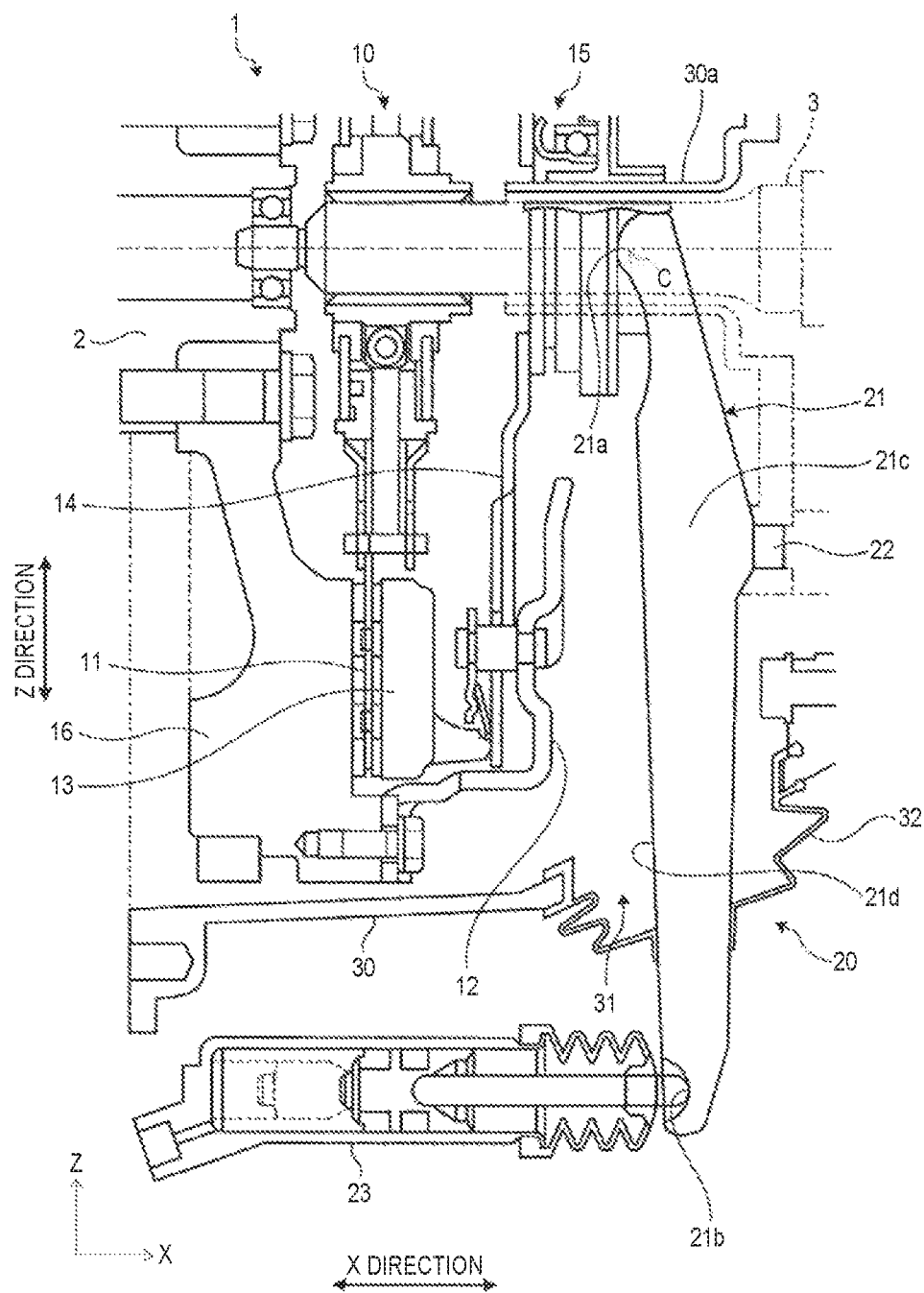
FIG. 1 is a view schematically illustrating a clutch release mechanism of a first embodiment.

FIG. 1 is a view schematically illustrating a clutch release mechanism of the reference example. As illustrated in FIG. 1, a clutch device 1 includes a clutch main body 10 that performs a power connection/disconnection operation, a clutch release mechanism 20 for operating the clutch main body 10, and a clutch housing 30 that accommodates the clutch main body 10 inside. For example, the clutch device 1 is mounted on a manual transmission vehicle and is arranged between an engine and a transmission.

An X direction illustrated in FIG. 1 represents an axial direction along a central axis, and a Z direction represents a direction (which may be called a radial direction or a height direction) orthogonal to the central axis. When the Z direction is the height direction, an upper side may be described as a tip end side and a lower side may be described as a base end side. Further, a Y direction, which will be described below, represents a direction orthogonal to the X direction and the Z direction. The Y direction may be described as a width direction.

The clutch main body 10 includes a clutch disc 11, a clutch cover 12, a pressure plate 13, a diaphragm spring 14, and a release bearing 15.

The clutch disc 11 has a friction surface (clutch-facing) interposed between the pressure plate 13 and a flywheel 16, and is spline-fitted to an input shaft 3 of the transmission. The rotation of the flywheel 16 is transmitted to the input shaft 3 by the frictional force between the friction surface of the clutch disc 11 and the flywheel 16. The flywheel 16 is bolted to a crankshaft 2 of the engine, and the flywheel 16 and the crankshaft 2 rotate integrally.

The clutch cover 12 is provided so as to cover an outer peripheral side of the clutch disc 11, and rotates integrally with the pressure plate 13 and the diaphragm spring 14. The pressure plate 13 is provided between the friction surface of the clutch disc 11 and the diaphragm spring 14. The diaphragm spring 14 is a member for pressing the friction surface of the clutch disc 11 toward the flywheel 16 via the pressure plate 13, and is provided on an opposite side of the friction surface of the clutch disc 11 with respect to the pressure plate 13. A peripheral edge portion of the diaphragm spring 14 is connected to the pressure plate 13, and a central portion of the diaphragm spring 14 is connected to the release bearing 15. This allows the diaphragm spring 14 to press the pressure plate 13.

When the clutch main body 10 is engaged, the pressure plate 13 presses the friction surface of the clutch disc 11 toward the flywheel 16 side by the elastic force of the diaphragm spring 14. This results in a connected state in which a frictional force is generated between the friction surface of the clutch disc 11 and the flywheel 16, and the rotation of the flywheel 16 is transmitted to the clutch disc 11.

When the clutch main body 10 is released, the release bearing 15 pushes the central portion of the diaphragm spring 14, so that the peripheral edge portion of the diaphragm spring 14 is displaced in a direction away from the flywheel 16. In this case, the pressure plate 13 is pulled in a direction away from the flywheel 16 together with the diaphragm spring 14. This results in a disconnected state in which the frictional force between the friction surface of the clutch disc 11 and the flywheel 16 is eliminated, and the rotation of the flywheel 16 is not transmitted to the clutch disc 11.

The clutch release mechanism 20 includes a clutch release fork 21, a release fork support 22, and a release cylinder 23.

The clutch release fork 21 is a member for moving the release bearing 15 in an axial direction, and is configured to be swingable while being supported by the release fork support 22. The clutch release fork 21 is an elongated member made of metal, and has a structure in which a tip end side is bifurcated.

As illustrated in FIG. 1, a first end side of the clutch release fork 21 is composed of a pressing portion 21a that presses the release bearing 15 in the axial direction. The pressing portion 21a is configured to have a bifurcated structure in which the tip end side is bifurcated so as to pinch the input shaft 3 inside the clutch housing 30. A portion (abutment portion) of the pressing portion 21a facing the release bearing 15 in the axial direction comes into contact with the release bearing 15. A second end side of the clutch release fork 21 is composed of a connection portion 21b that protrudes to the outside of the clutch housing 30 through a through hole 31 of the clutch housing 30 and is connected to the release cylinder 23. Further, the second end side of the clutch release fork 21 is covered with a fork boot 32 at a position extending to the outside of the clutch housing 30. The fork boot 32 is attached to the through hole 31. The fork boot 32 may be provided with a hole (cooling hole) for releasing, to the outside of the clutch housing 30, the frictional heat generated when the clutch main body 10 is in a semi-engaged state.

Further, the clutch release fork 21 has a fulcrum portion 21c supported by the release fork support 22 between the pressing portion 21a and the connection portion 21b. The release fork support 22 is composed of a main body portion fixed to a partition wall of the clutch housing 30 and a pivot portion (not illustrated) having a spherical surface on a tip end side of the main body portion. The partition wall of the clutch housing 30 is composed of a retainer to which a bearing (not illustrated) for supporting the input shaft 3 is attached. The retainer is a member fixed to the clutch housing 30. A base side of the release fork support 22 is bolted to the retainer. Further, inside the clutch housing 30, a boss portion 30a of the retainer extends along the input shaft 3. The input shaft 3 is inserted inside the boss portion 30a.

The release bearing 15 is configured to be movable in the axial direction with respect to the boss portion 30a in a state of being supported on an outer periphery of the boss portion 30a via a sleeve. The release bearing 15 is arranged so as to contact the central portion of the diaphragm spring 14. The release bearing 15 has an outer ring supported by a sleeve on the boss portion 30a and an inner ring in contact with the central portion of the diaphragm spring 14. In the release bearing 15, an inner ring in contact with the diaphragm spring 14 rotates, and an outer ring in contact with the clutch release fork 21 does not rotate.

Then, when a driver depresses a clutch pedal (not illustrated), the release cylinder 23 operates. When the connection portion 21b is operated by the release cylinder 23, the clutch release fork 21 swings with the fulcrum portion 21c as a fulcrum. Due to this swing, the pressing portion 21a presses the release bearing 15, and the release bearing 15 moves in the axial direction, and then the central portion of the diaphragm spring 14 is pushed toward the flywheel 16 side. As a result, the clutch main body 10 comes to be in a release state. When the clutch main body 10 is in the release state, the flywheel 16 and the clutch disc 11 are disconnected so that power cannot be transmitted. When the operating force from the release cylinder 23 is released, the pressing force acting on the release bearing 15 from the pressing portion 21a disappears. As a result, the clutch main body 10 comes to be in an engaged state. When the clutch main body 10 is in the engaged state, the flywheel 16 and the clutch disc 11 are connected so as to be able to transmit power. In this way, the swing of the clutch release fork 21 connects and disconnects a power transmission path between the crankshaft 2 on the engine side and the input shaft 3 on the transmission side.

Next, a greasing device of the reference example will be described. A greasing device 100 is a device that supplies grease to a contact portion between the pressing portion 21a of the clutch release fork 21 and the release bearing 15. The greasing device 100 is configured such that a second jig 120 (insertion portion 121) is inserted into guide through holes (first hole 113, second hole 114) of a first jig 110 fixed to the clutch housing 30 as described below, and a second jig 120 (insertion portion 121) is inserted toward a corresponding portion C until a tip end portion 131 of a greasing pipe 130 provided on the second jig 120 and the corresponding portion C have a predetermined positional relationship. As illustrated in FIG. 1, the corresponding portion C refers to a contact portion between the clutch release fork 21 (pressing portion 21a) and the release bearing 15, which is a portion requiring greasing (portion where grease needs to be supplied from the tip end portion 131 of the greasing pipe 130). As illustrated in FIG. 1, the corresponding portion C is arranged in an internal space surrounded by the clutch housing 30 (an example of a cover member of the present disclosure). The clutch housing 30 is formed with a through hole (through hole 31) for fixing a jig that communicates with the internal space.

When a vehicle equipped with the clutch device 1 is used in an environment where sand, muddy water, and the like are present, foreign matter may enter the clutch housing 30 from the cooling hole of the fork boot 32 described above, the cooling hole provided in the clutch housing 30, or an opening portion (none of which is shown) for draining water. Therefore, it is desirable, in performing greasing maintenance for the clutch release mechanism 20, to additionally supply grease to the contact portion between the clutch release fork 21 and the release bearing 15. Therefore, the greasing device 100 is configured so that the operation of greasing maintenance can be performed without detachment of the clutch housing 30 (or a manual transmission unit including the clutch housing 30) to or from the vehicle. The greasing device 100 supplies grease from the outside of the clutch housing 30 through the through hole 31 of the clutch housing 30 to the contact portion between the clutch release fork 21 and the release bearing 15, which is the portion requiring greasing, by using the greasing pipe 130 (illustrated in FIG. 2 and the like).

Figure 2:
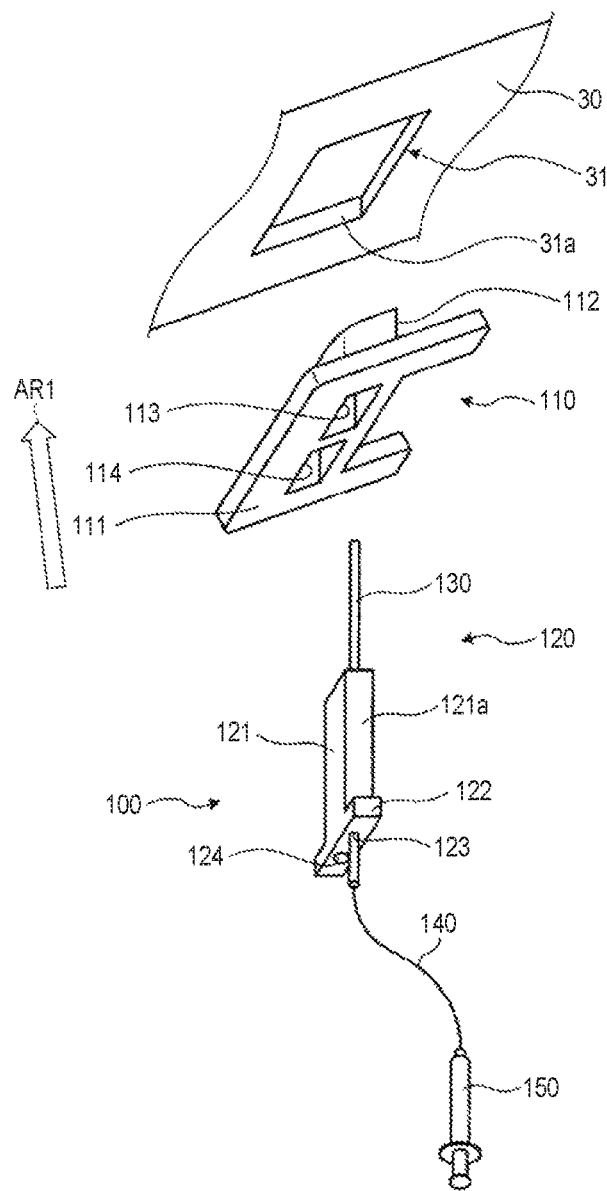
FIG. 2 is a view schematically illustrating a greasing device according to the first embodiment.

As illustrated in FIG. 2, the greasing device 100 includes the first jig 110, the second jig 120, the greasing pipe 130, a flexible pipe 140, and a greasing device 150. The first jig 110 and the second jig 120 are members for positioning the greasing pipe 130. The first jig 110 is a member attached to the through hole 31 of the clutch housing 30. The second jig 120 is a member inserted into the insertion hole of the first jig 110.

The first jig 110 is a guide jig that regulates a direction (insertion direction) of the greasing pipe 130 (grease injection pipe), and includes a base portion 111, a protrusion portion 112, and the first hole 113 and second hole 114 as positioning holes. The first jig 110 is an integrally molded product made of metal. The base portion 111 is formed in a flat plate shape and has a shape capable of partially covering the opening portion of the through hole 31. The width (the length in the Y direction described below) of the base portion 111 is larger than the opening width of the through hole 31. The protrusion portion 112 is a portion protruding from the base portion 111 and is a portion inserted into the through hole 31. The protrusion portion 112 functions as a positioning portion for positioning the first jig 110 by abutting on an inner surface 31a of the through hole 31 and abutting on a plane 21d of the clutch release fork 21.

The first hole 113 and the second hole 114 are insertion holes into which the greasing pipe 130 and the insertion portion 121 of the second jig 120 are inserted, and are positioning holes for positioning the greasing pipe 130. The first hole 113 and the second hole 114 are formed side by side in a width direction of the first jig 110, and both are through holes penetrating from the base portion 111 on a base end side toward the protrusion portion 112 on a tip end side. In this description, the term "insertion hole" is used when the first hole 113 and the second hole 114 are not particularly distinguished.

The second jig 120 has the insertion portion 121 having a quadrangular cylindrical shape inserted into the first hole 113 or the second hole 114 of the first jig 110, and a stopper portion 122 that abuts on a surface 111a of the first jig 110. The second jig 120 is an integrally molded product made of metal. Further, the greasing pipe 130 is integrated with the second jig 120. The second jig 120 has two through holes 123, 124 extending linearly along the insertion portion 121 from the base end side to the tip end side. One through hole 123 is a hole for a greasing pipe. The other through hole 124 is a hole for an endoscope. The greasing pipe 130 is fixed in the through hole 123 in a state of being inserted. An endoscope 160 is fixed in the through hole 124 in a state of being inserted (see FIG. 3). Further, the stopper portion 122 has a stopper surface 122a (illustrated in FIG. 3) that abuts on the surface 111a of the first jig 110.

The greasing pipe 130 is a pipe for supplying grease to the contact portion between the pressing portion 21a of the clutch release fork 21 and the release bearing 15 inside the clutch housing 30. The greasing pipe 130 is a long injection portion containing the tip end portion 131 from which grease (an example of the fluid substance of the present disclosure) is injected. The greasing pipe 130 is made of metal. The tip end portion 131 of the greasing pipe 130 is provided with an opening portion 131a (hereinafter, also referred to as an injection port 131a) for injecting grease. The flexible pipe 140 is connected to the base end side of the greasing pipe 130. The greasing pipe 130 is connected to the greasing device 150 via the flexible pipe 140.

Figure 3:
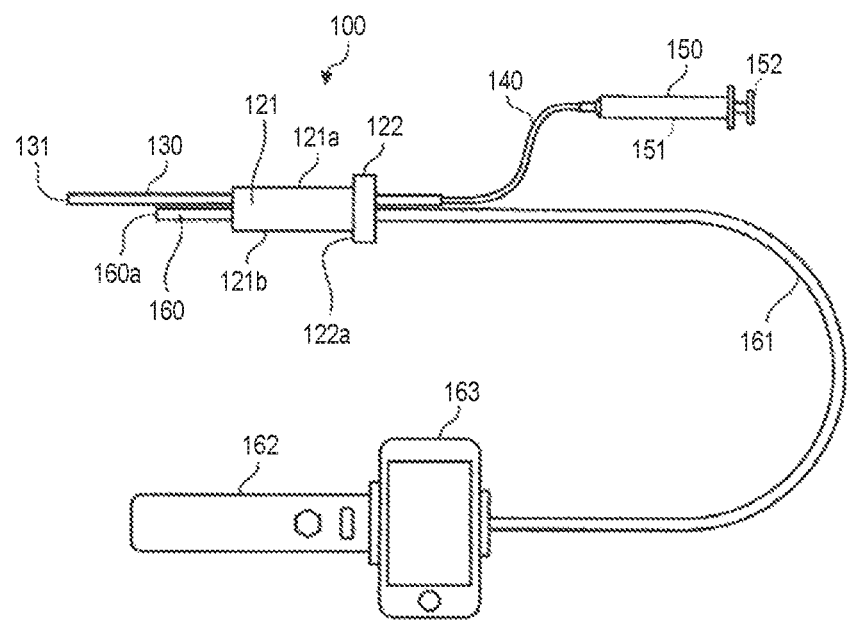
FIG. 3 is a schematic view for illustrating the greasing device.

As illustrated in FIG. 3, the greasing device 100 includes the endoscope 160 as imaging means. The endoscope 160 is a long imaging device including an imaging unit for capturing an image including the tip end portion 131 of the greasing pipe 130 and its surrounding environment (for example, corresponding portion C) in a tip end portion 160a. The endoscope 160 is integrated with the second jig 120 and protrudes from the tip end side of the insertion portion 121. The tip end side of the endoscope 160 is a portion inserted into the clutch housing 30, and a lens is provided at a tip end portion 160a. The base end side of the endoscope 160 is connected to an operation portion 162 via a cable 161. By operating the operation portion 162, the internal structure of the clutch housing 30 can be photographed by the endoscope 160. An image (for example, an image including the tip end portion 131 of the greasing pipe 130 and its surrounding environment (for example, the corresponding portion C)) taken by the endoscope 160 can be displayed on a display portion 163 attached to the operation portion 162.

The greasing device 150 is composed of a cylinder 151 and a push rod 152 (piston) (see FIG. 3). The flexible pipe 140 is connected to the cylinder 151 of the greasing device 150. By pushing the push rod 152 with the grease filled in the cylinder 151, the grease can be supplied from the greasing device 150 to the greasing pipe 130. It is also possible to perform greasing smoothly by, for example, inserting the greasing pipe 130 from the through hole 31 into the clutch housing 30 with grease filled in the greasing pipe 130 and the flexible pipe 140 in advance and operating the greasing device 150.

Figure 4A:
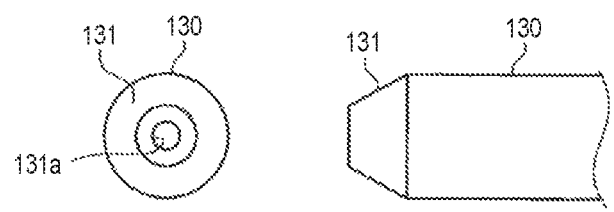
FIG. 4A is a view illustrating an example of an opening portion of a greasing pipe.
Figure 4B:
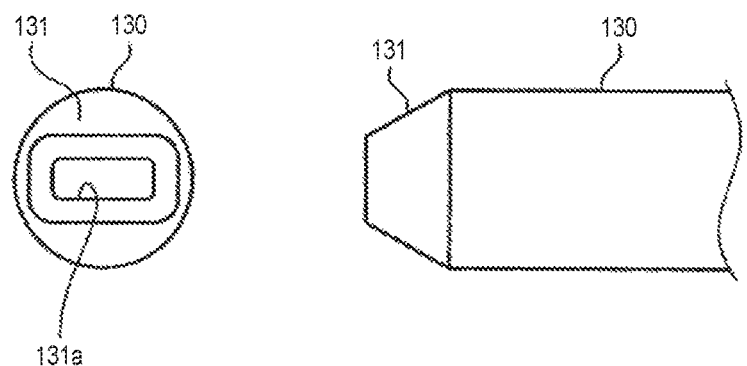
FIG. 4B is a view illustrating another example of the opening portion of the greasing pipe.

The tip end portion 131 of the greasing pipe 130 has a reduced diameter shape and includes the opening portion 131a for injecting grease. For example, the opening portion 131a of the greasing pipe 130 may be the opening portion 131a having a circular shape, as illustrated in FIG. 4A. Alternatively, as illustrated in FIG. 4B, the opening portion 131a may be the opening portion 131a having a flat shape. Since the tip end portion 131 of the greasing pipe 130 has a reduced diameter shape, it is possible to perform greasing on the portion requiring greasing through a narrow space in the clutch housing 30.

Figure 5:
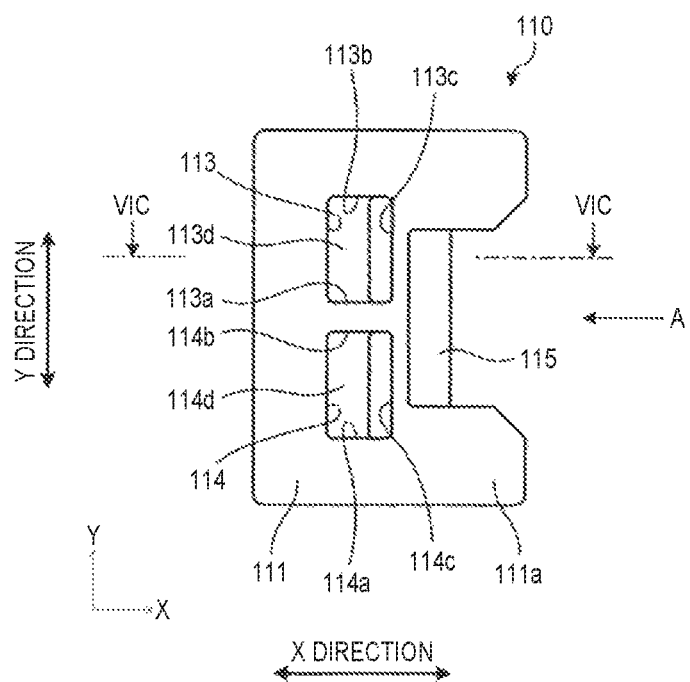
FIG. 5 is a plan view of a base end side of a first jig.
Figure 6A:
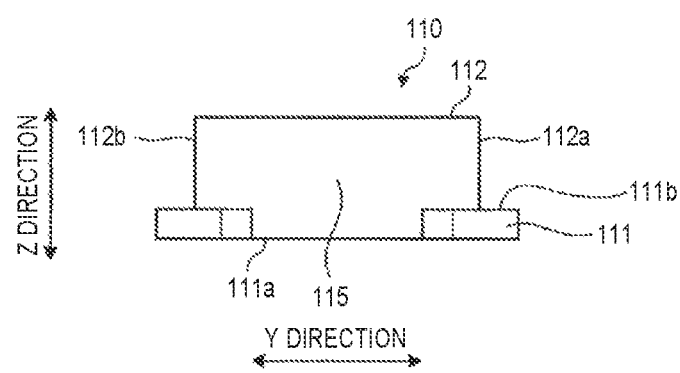
FIG. 6A is a view seen from a direction of the arrow A in FIG. 5.
Figure 6B:
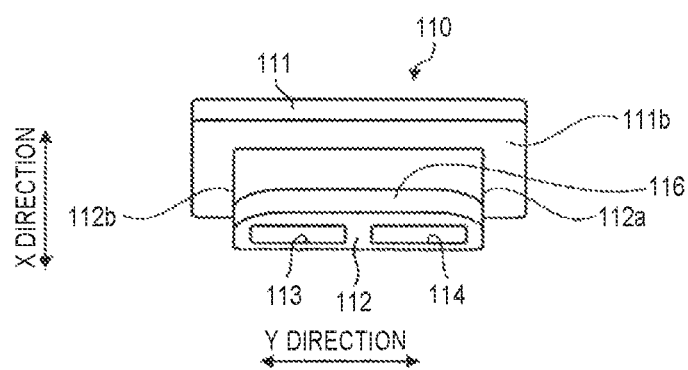
FIG. 6B is a perspective view of the first jig as viewed from a back side.
Figure 6C:
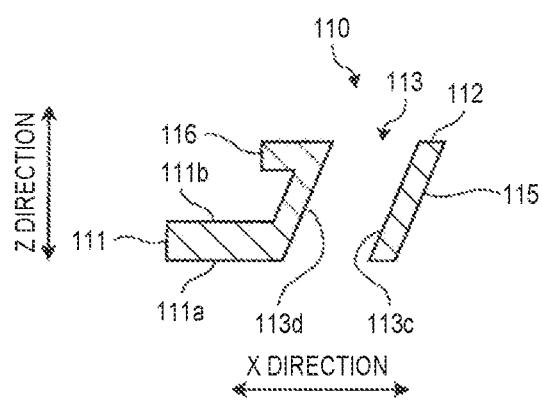
FIG. 6C is a view illustrating a cross section taken along the line VIC-VIC of FIG. 5.

Here, the first jig 110 will be described in detail with reference to FIGS. 5 and 6A to 6C. FIG. 5 is a plan view of the base end side of the first jig 110. FIG. 6A is a view seen from a direction of the arrow A in FIG. 5. FIG. 6B is a perspective view of the first jig 110 as viewed from the back side. FIG. 6C is a view illustrating a cross section taken along the line VIC-VIC of FIG. 5.

As illustrated in FIG. 5, the first jig 110 has rectangular opening portions of the first hole 113 and the second hole 114 on the surface 111a side of the base portion 111. The inner surface of the first hole 113 is a surface that functions as a guide surface for positioning the greasing pipe 130 by making the insertion portion 121 abut thereon. The inner surface of the first hole 113 has a first surface 113a, a second surface 113b, a third surface 113c, and a fourth surface 113d. The first surface 113a and the second surface 113b are surfaces facing each other in the Y direction, and are respectively short sides of the rectangular shape. The third surface 113c and the fourth surface 113d are surfaces facing each other in the X direction, and are respectively long sides of the rectangular shape. The inner surface of the second hole 114 is a surface that functions as a guide surface for positioning the greasing pipe 130, and has a first surface 114a, a second surface 114b, a third surface 114c, and a fourth surface 114d. The first surface 114a and the second surface 114b are surfaces facing each other in the Y direction, and are respectively short sides of the rectangular shape. The third surface 114c and the fourth surface 114d are surfaces facing each other in the X direction, and are respectively long sides of the rectangular shape.

Further, the first jig 110 has an abutment surface 115 that abuts on the plane 21d of the clutch release fork 21. The abutment surface 115 is a positioning surface, and the position of the first jig 110 in the X direction can be determined by making the abutment surface 115 abut on the plane 21d of the clutch release fork 21. As illustrated in FIG. 6A, the abutment surface 115 has a predetermined width in the width direction (Y direction) of the base portion 111 and extends along the height direction (Z direction) of the protrusion portion 112.

As illustrated in FIG. 6B, a key portion 116 is provided on a back surface 111b side of the first jig 110. The key portion 116 is a portion that is caught by the clutch housing 30 when the protrusion portion 112 is inserted into the through hole 31. This key portion 116 functions as a portion for holding the first jig 110 in the through hole 31. Further, opening portions of the first hole 113 and the second hole 114 that open in the protrusion portion 112 are also rectangular as in the base end side. As illustrated in FIG. 6C, the first hole 113 extends linearly inside the protrusion portion 112.

Figure 7:
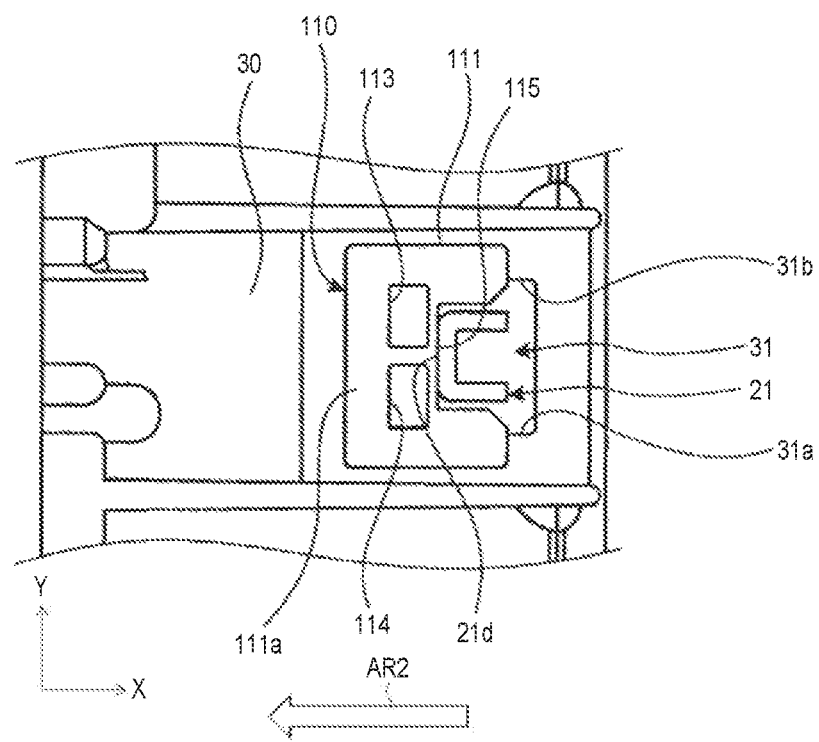
FIG. 7 is a view illustrating a state in which the first jig is attached to a through hole of a clutch housing.
Figure 8:
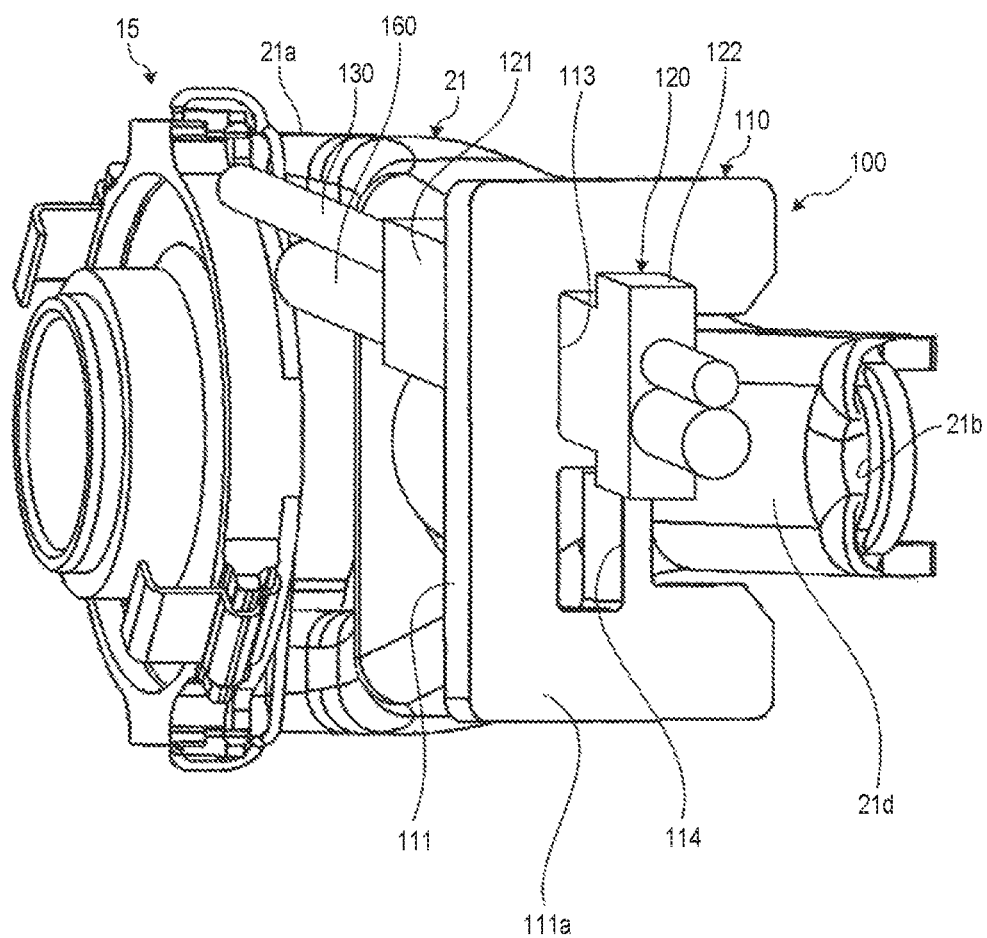
FIG. 8 is a view illustrating a state in which the greasing pipe extends toward a pressing portion of a clutch release fork with a second jig inserted in an insertion hole of the first jig.
Figure 9:
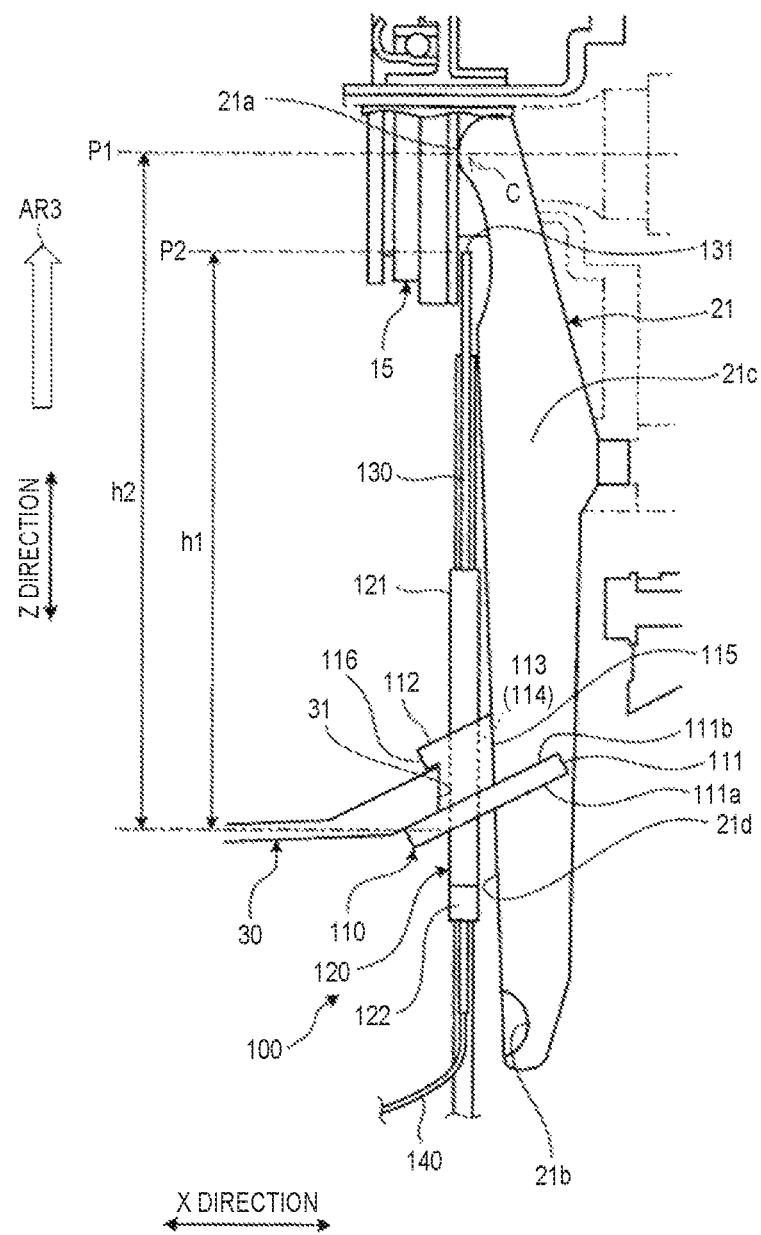
FIG. 9 is a view for illustrating a height position of a tip end portion of the greasing pipe.

Next, a greasing method using the greasing device 100 will be described with reference to FIGS. 7 to 9. FIG. 7 is a view illustrating a state in which the first jig 110 is attached to the through hole 31 of the clutch housing 30. FIG. 8 is a view illustrating a state in which the greasing pipe 130 extends toward the pressing portion 21a of the clutch release fork 21 with the second jig 120 inserted in the insertion hole of the first jig 110. FIG. 9 is a view for illustrating the height position of the tip end portion 131 of the greasing pipe 130. The Z direction illustrated in FIG. 9 represents the height direction. The fork boot 32 will be removed before performing each of the following steps. As a result, the through hole 31 (see FIGS. 2, 9, and the like) of the clutch housing 30 for inserting the greasing pipe 130 and the like is exposed.

As a first step, the first jig 110 is fixed to the through hole 31 of the clutch housing 30.

Figure 10:
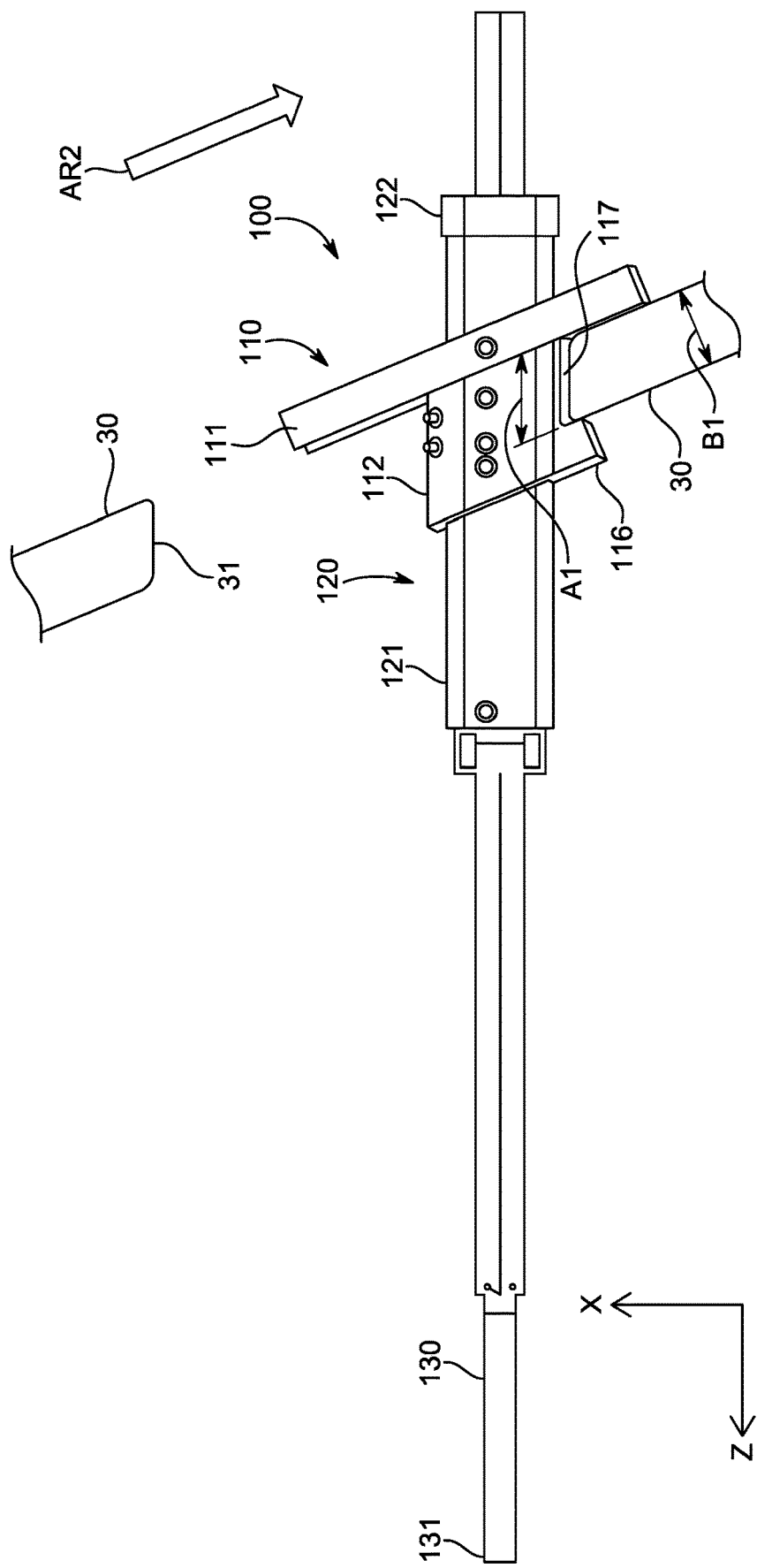
FIG. 10 is a view illustrating the first jig and the second jig extracted from FIG. 9.

FIG. 10 is a view illustrating the first jig 110 and the second jig 120 extracted from FIG. 9.

As illustrated in FIG. 10, the first jig 110 is fixed to the clutch housing 30 (peripheral portion of the through hole 31) in a state of being positioned in the X direction, the Y direction, and the Z direction with respect to the clutch housing 30.

Specifically, first, the protrusion portion 112 of the first jig 110 and the through hole 31 of the clutch housing 30 are made to face each other (see FIG. 2), and the abutment surface 115 of the first jig 110 and the clutch release fork 21 (plane 21d) are made to face (contact) each other (see FIG. 7).

Next, the protrusion portion 112 of the first jig 110 is inserted into the through hole 31, and the first jig 110 is slid along the clutch release fork 21 (plane 21d) in a direction (see the arrow AR1 in FIG. 2) approaching the through hole 31 until the base portion 111 of the first jig 110 abuts on the peripheral portion of the through hole 31 of the clutch housing 30.

By inserting the protrusion portion 112 of the first jig 110 into the through hole 31 and making side surfaces 112a and 112b of the protrusion portion 112 and the inner surfaces 31a and 31b of the through hole 31 face (abut) to each other respectively, the first jig 110 is positioned in the Y direction with respect to the clutch housing 30.

Further, by making the base portion 111 of the first jig 110 abut on the peripheral portion of the through hole 31 of the clutch housing 30, the first jig 110 is positioned with respect to the clutch housing 30 in the Z direction.

Next, the first jig 110 in a state of being positioned in the Y direction and the Z direction with respect to the clutch housing 30 as described above is pushed in the arrow AR2 direction (see FIGS. 7 and 10).

Specifically, the peripheral portion of the through hole 31 of the clutch housing 30 is inserted (press-fitted) into a space between the base portion 111 and the key portion 116 of the first jig 110 (see FIG. 10), and the first jig 110 in a state of being positioned in the Y direction and the Z direction with respect to the clutch housing 30 as described above is pushed in the arrow AR2 direction (see FIGS. 7 and 10) until the peripheral portion of the through hole 31 touches a bottom portion 117 between the base portion 111 and the key portion 116 of the first jig 110.

A distance A1 (see FIG. 10) between the base portion 111 and the key portion 116 of the first jig 110 and a thickness B1 (see FIG. 10) of the peripheral portion of the through hole 31 of the clutch housing 30 are set so that the relationship of A1<B1 is satisfied. Therefore, when the first jig 110 in a state of being positioned in the Y direction and the Z direction with respect to the clutch housing 30 as described above is pushed in the arrow AR2 direction (see FIGS. 7 and 10), the peripheral portion of the through hole 31 of the clutch housing 30 is inserted (press-fitted) into the space between the base portion 111 and the key portion 116 of the first jig 110. As a result, the first jig 110 is fixed to the clutch housing 30.

By making the peripheral portion of the through hole 31 of the clutch housing 30 touch the bottom portion 117 between the base portion 111 and the key portion 116 of the first jig 110, the first jig 110 is positioned with respect to the clutch housing 30 in the X direction.

As described above, the first jig 110 is fixed to the clutch housing 30 (peripheral portion of the through hole 31) in a state of being positioned in the X direction, the Y direction, and the Z direction with respect to the clutch housing 30 (the example of the fixing target member of the present disclosure). In other words, the first jig 110 engages with the peripheral portion of the through hole 31 of the clutch housing 30 in a state of being positioned in the X direction, the Y direction, and the Z direction with respect to the clutch housing 30.

In a state in which the first jig 110 is fixed to the clutch housing 30 (peripheral portion of the through hole 31) in this way, the first hole 113 of the first jig 110 extends toward the corresponding portion C (first pressing portion 21a) (see FIG. 9). Similarly, the second hole 114 of the first jig 110 extends toward the corresponding portion C (second pressing portion 21a). The first jig 110 can be removed from the clutch housing 30 by following the reverse procedure of the above.

As the next step of the first step, a step (insertion step) in which the greasing pipe 130 and the second jig 120 are inserted into the insertion hole (first hole 113, second hole 114) of the first jig 110 fixed to the clutch housing 30 as described above is performed. In this insertion step, when the second jig 120 is inserted into the insertion hole (first hole 113, second hole 114) of the first jig 110, a step of inserting the second jig 120 in two steps is performed. Marking lines described below in a second embodiment are attached to side surfaces 121a and 121b of the insertion portion 121 of the second jig 120 at positions at a predetermined distance from the tip end side. The outer peripheral shape of the insertion portion 121 is formed to be rectangular. The side surfaces 121a and 121b are short side portions of a rectangle shape. Further, the side surface 121a is the first surface in the Y direction, and the side surface 121b is the second surface in the Y direction. Further, the rectangle shape of the insertion portion 121 is smaller than the rectangle shape of the opening portion of the first hole 113 and the rectangle shape of the opening portion of the second hole 114.

As illustrated in FIG. 8, by inserting the insertion portion 121 of the second jig 120 into the first hole 113 of the first jig 110, the greasing pipe 130 extends toward the pressing portion 21a of the clutch release fork 21 which is the portion requiring greasing. Since the pressing portion 21a has a bifurcated structure, the greasing pipe 130 inserted into the first hole 113 extends toward the first pressing portion 21a. By the time the greasing pipe 130 reaches the vicinity of the pressing portion 21a of the clutch release fork 21, it may be necessary to avoid obstacles inside the clutch housing 30. For example, an obstacle may be a clip, which is a component of the release bearing 15. Since the clip is provided near the bifurcated structure of the clutch release fork 21, it is desirable that the greasing pipe 130 does not touch the clip before reaching the pressing portion 21a.

Here, as a second step (the first half step of the insertion step), the insertion portion 121 of the second jig 120 is inserted into the insertion hole of the first jig 110 up to the position of the marking line. In the inserted state of this second step, the greasing pipe 130 and the endoscope 160 can be operated to displace the position of the second jig 120 with respect to the first jig 110 within the insertion hole so that the greasing pipe 130 and the endoscope 160 can avoid obstacles in the clutch housing 30. That is, as a third step, a step (avoidance operation step) of operating the second jig 120 so as to avoid the internal structure of the clutch housing 30 is performed. In the following steps, while an operator pays close attention to a screen (image including the tip end portion 131 of the greasing pipe 130 and its surrounding environment (for example, corresponding portion C)) displayed on the display portion 163 attached to the operation portion 162 grasped by one hand (for example, the right hand), the operator performs an operation of inserting the second jig 120 (insertion portion 121) gripped by the other hand (for example, the left hand) toward the corresponding portion C in a direction of the arrow AR3 (see FIG. 9) so that the tip end portion 131 of the greasing pipe 130 reaches the corresponding portion C (see FIG. 9).

In the third step, in a state in which the insertion portion 121 is inserted into the first hole 113, a clearance (about 0.5 mm) is provided between the side surfaces 121a and 121b of the insertion portion 121 and the inner surface (inner wall) of the first hole 113. Similarly, in a state in which the insertion portion 121 is inserted into the second hole 114, a clearance (about 0.5 mm) is provided between the side surfaces 121a and 121b of the insertion portion 121 and the inner surface (inner wall) of the second hole 114. Therefore, when the second jig 120 is inserted into the insertion hole up to the position of the marking line, the greasing pipe 130 can be positioned where the greasing pipe 130 does not come into contact with the clip of the release bearing 15 and at a position avoiding the internal structure such as a clip. In this case, it is possible to hold the stopper portion 122 side in the hand and swing the tip end side of the insertion portion 121 in the Y direction.

As illustrated in FIG. 9, the height position of the tip end portion 131 of the greasing pipe 130 is a height at which the tip end portion 131 can avoid the clip of the release bearing 15 at a height h1. In this case, the insertion of the greasing pipe 130 is stopped and the position of the tip end portion 131 is controlled so as to avoid the clip of the release bearing 15. The height h1 also represents the insertion amount (stroke amount).

For example, in the third step, from the state in which the side surface 121b of the insertion portion 121 is applied to the first surface 113a of the first hole 113, as an operation of the greasing pipe 130 to avoid obstacles in the clutch housing 30, the side surface 121a of the insertion portion 121 is brought into contact with the second surface 113b of the first hole 113, which was in a non-contact state with the side surface 121a of the insertion portion 121. In this case, the second jig 120 is moved until the insertion portion 121 slides on the third surface 113c of the first hole 113 and the side surface 121a comes into contact with the second surface 113b. This slide includes parallel translation movement in the Y direction and swinging the tip end portion 131 side from the right to the left. As a result, the greasing pipe 130 is in a position where it does not come into contact with the clip.

In this way, after the position of the greasing pipe 130 is fixed at the position to avoid the obstacles in the clutch housing 30, the tip end portion 131 of the greasing pipe 130 is approached again toward the portion requiring greasing. That is, the insertion step of the second jig 120 is restarted, and the insertion portion 121 is inserted into the through hole 31 until the stopper portion 122 of the second jig 120 abuts on the base portion 111 of the first jig 110. In a state in which the stopper portion 122 of the second jig 120 is in contact with the first jig 110, the tip end portion 131 of the greasing pipe 130 is inserted to a predetermined target position in the clutch housing 30. That is, as a fourth step (the latter half step of the insertion step), the insertion portion 121 is inserted deeper than the position of the marking line, and the tip end portion 131 of the greasing pipe 130 is inserted to the portion requiring greasing.

As illustrated in FIG. 9, in the fourth step, the tip end portion 131 of the greasing pipe 130 reaches a height h2 where one of the bifurcated structures, the first pressing portion 21a, is located. In this way, the tip end portion 131 of the greasing pipe 130 can be positioned in the vicinity of the pressing portion 21a of the clutch release fork 21. The height h2 has a larger insertion amount than the height h1.

Then, as a fifth step, a step of supplying grease from the opening portion 131a of the greasing pipe 130 is performed. In the fifth step, while paying close attention to the screen (image including the tip end portion 131 of the greasing pipe 130 and its surrounding environment (for example, corresponding portion C)) displayed on the display portion 163 attached to the operation portion 162 grasped by one hand (for example, the right hand), the operator grasps the greasing device 150 with the other hand (for example, the left hand) and operates it (for example, pushing the push rod 152 illustrated in FIG. 3 in the axial direction thereof) to supply grease from the opening portion 131a of the greasing pipe 130 to the corresponding portion C (see FIG. 9). In the fifth step, when an appropriate amount of grease is supplied from the greasing device 150 connected to the greasing pipe 130, an appropriate amount of grease is ejected from the tip end portion 131 of the greasing pipe 130, and the grease is applied to the pressing portion 21a. In this case, the grease from the greasing device 150 is filled in the greasing pipe 130 in advance. Therefore, when the tip end portion 131 of the greasing pipe 130 is determined at a desired position, greasing by operating the greasing device 150 is smoothly performed.

Then, when the greasing in the fifth step is completed, the greasing pipe 130 is pulled out as a sixth step. In the sixth step, the grease from the tip end portion 131 of the greasing pipe 130 is cut while the first jig 110 is attached to the through hole 31. Then, the second jig 120 is pulled out from the through hole 31, and the tip end portion 131 of the greasing pipe 130 is also pulled out from the through hole 31 to the outside of the clutch housing 30.

For example, the second jig 120 is pulled out from the insertion hole of the first jig 110. When the second jig 120 is pulled out from the insertion hole of the first jig 110, it can be swung right and left by the clearance between the insertion hole and the insertion portion 121. As a result, it is possible to prevent grease from adhering to portions and parts other than the portion requiring greasing.

When the steps from the first step to the fifth step described above are steps for the first hole 113, while maintaining the attached state of the first jig 110, the steps from the second step to the fifth step for the second hole 114 are performed. This makes it possible to perform greasing on both sides of the pressing portion 21a with the bifurcated structure.

When there are no obstacles inside the clutch housing 30 up to the portion requiring greasing, the above-described second step and third step may be omitted. In this case, the marking line of the second jig 120 is not necessary, and the fourth step may be performed following the first step, and the insertion portion 121 of the second jig 120 may be inserted into the insertion hole of the first jig 110 and continuously inserted until the stopper portion 122 abuts on the first jig 110.

As described above, according to the greasing device 100 of the first embodiment, it is possible to perform greasing on the pressing portion 21a of the clutch release fork 21 without detachment of the clutch housing 30 (or a manual transmission unit including the clutch housing 30) from the vehicle. This facilitates greasing maintenance work and improves workability.

First Embodiment

Next, an injection device of a first embodiment will be described.

Figure 11:
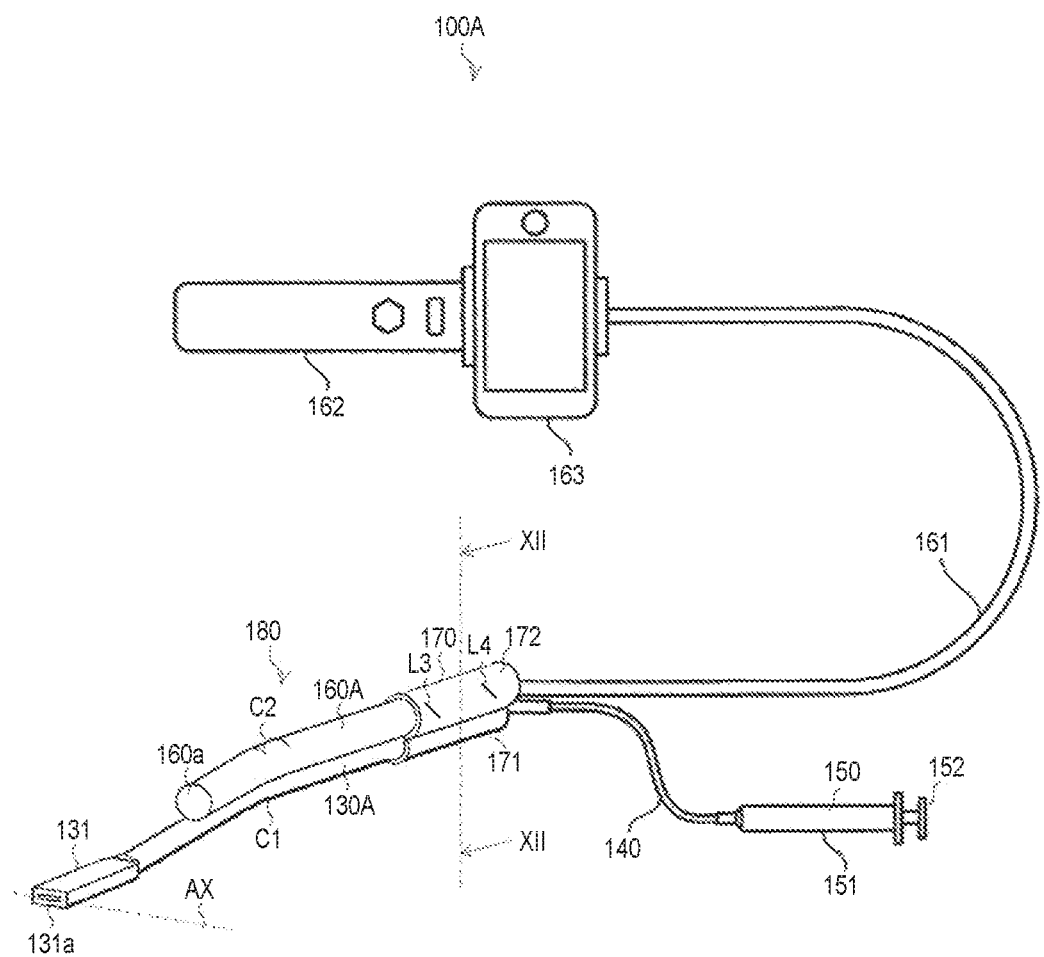
FIG. 11 is a configurational view of an injection device.

FIG. 11 is a configurational view of an injection device 100A.

The injection device 100A of the first embodiment is different from that of the reference example mainly in that it does not include the first jig 110 and the second jig 120 and includes a holding member 170. Hereinafter, the differences from the reference example will be mainly described, and the same components as those of the reference example will be designated by the same reference numerals and the description thereof will be omitted as appropriate.

Figure 17:
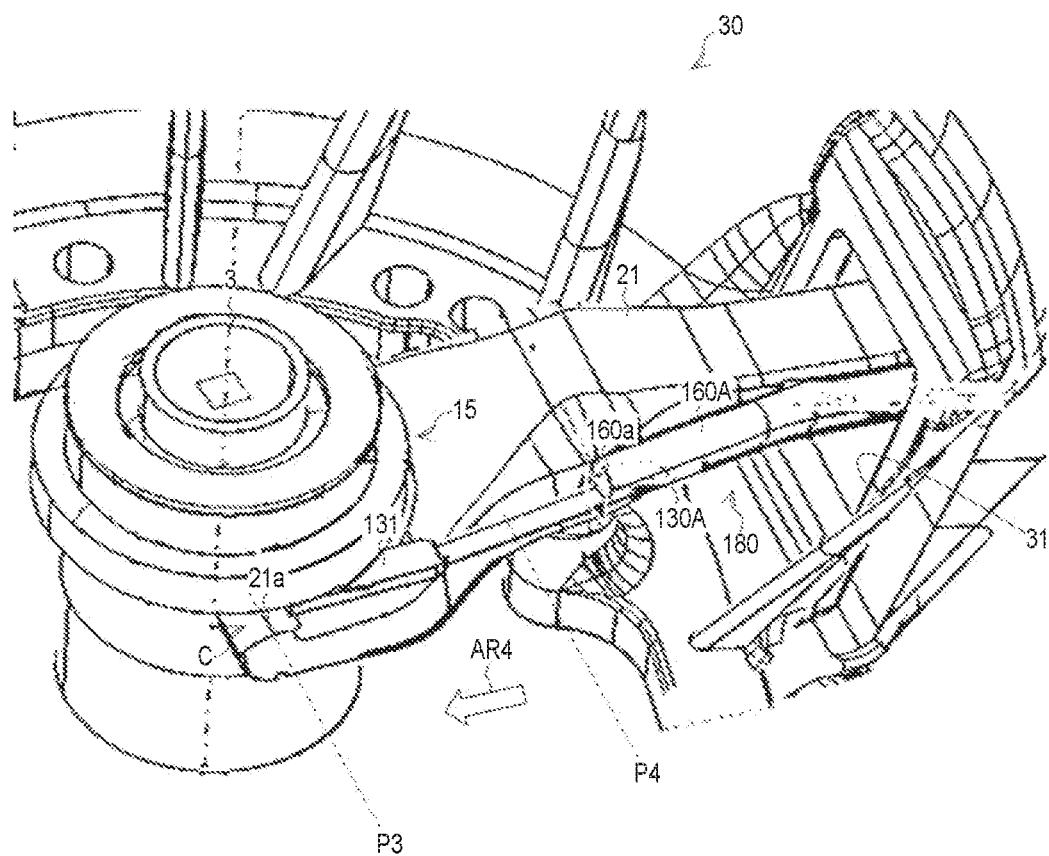
FIG. 17 is a view illustrating a state in which the greasing pipe extends toward the corresponding portion on the front side in a state in which the insertion portion is inserted into the through hole 31 of the clutch housing.

Similar to the reference example, the injection device 100A of the first embodiment includes an insertion portion 180 (see FIG. 11) that is inserted toward the corresponding portion C in a narrow space while being gripped by an operator. The insertion portion 180 includes a greasing pipe 130A, an endoscope 160A, and the holding member 170. Hereinafter, similar to the reference example, the case where the narrow space is a portion requiring greasing (portion where grease needs to be supplied from the tip end portion 131 of the greasing pipe 130A) between the clutch release fork 21 (pressing portion 21a) and the release bearing 15 will be described as an example. One end side of the clutch release fork 21 is composed of the pressing portion 21a that presses the release bearing 15 in the axial direction (see FIG. 17). The pressing portion 21a is configured to have a bifurcated structure in which the tip end side is bifurcated so as to pinch the input shaft 3 inside the clutch housing 30. In FIG. 17, the corresponding portion C on the front side is illustrated, but the corresponding portion C on the back side is arranged behind the release bearing 15 and is not illustrated.

The greasing pipe 130A is a long injection portion including a tip end portion 131 from which grease (an example of the fluid substance of the present disclosure) is injected, similar to the greasing pipe 130 of the reference example. The greasing pipe 130A is made of metal. To make it easier to insert the tip end portion 131 of the greasing pipe 130A into a portion between the clutch release fork 21 (pressing portion 21a) and the release bearing 15, which is the portion requiring greasing, the tip end portion 131 of the greasing pipe 130A has a quadrangular cylindrical shape having a horizontally long rectangular cross section (see FIG. 11). The greasing pipe 130A has a cylindrical shape except for the tip end portion 131. The greasing pipe 130A may have a cylindrical shape including the tip end portion 131.

The layout of the internal structure of the clutch housing 30 may differ depending on the vehicle model (for each manual transmission unit). Depending on the layout of the internal structure of the clutch housing 30, the route for inserting the insertion portion 180 (greasing pipe 130A and endoscope 160A) from the through hole 31 of the clutch housing 30 toward the corresponding portion C may be linear, or the insertion route may include one or more bent portions in the middle.

In the latter case, when the greasing pipe 130A extends linearly like the greasing pipe 130 of the reference example, the insertion portion 180 (greasing pipe 130A and endoscope 160A) interferes with the obstacles inside the clutch housing 30. Therefore, it is difficult to insert the insertion portion 180 (greasing pipe 130A and endoscope 160A) toward the corresponding portion C.

Therefore, in the first embodiment, assuming that the path for inserting the insertion portion 180 (greasing pipe 130A and endoscope 160A) includes a bent portion in the middle, a portion C1 between the base end portion and the tip end portion 131 is bent. This makes it relatively easy to insert the insertion portion 180 (greasing pipe 130A and endoscope 160A) toward the corresponding portion C even when there is a bent portion in the middle of the path through which the insertion portion 180 (greasing pipe 130A and endoscope 160A) is inserted. Depending on the path through which the insertion portion 180 (greasing pipe 130A and endoscope 160A) is inserted, the greasing pipe 130A may be bent at a plurality of points between the base end portion and the tip end portion 131.

The tip end portion 131 (tip end surface) of the greasing pipe 130A is provided with an injection port 131a for injecting grease supplied through a cylindrical pipe portion. A flexible pipe 140 is connected to the base end side of the greasing pipe 130A. The greasing pipe 130A is connected to the greasing device 150 via the flexible pipe 140.

The endoscope 160A is a long imaging device including an imaging unit for capturing an image including the tip end portion 131 of the greasing pipe 130A and its surrounding environment (for example, the corresponding portion C) in the tip end portion 160a. The endoscope 160A has a cylindrical shape having a diameter larger than that of the greasing pipe 130A, and a portion C2 between the base end portion and the tip end portion 160a is bent at the same angle as the greasing pipe 130A. Similar to the greasing pipe 130A, the endoscope 160A may be bent at a plurality of points between the base end portion and the tip end portion 160a depending on the path through which the insertion portion 180 (greasing pipe 130A and endoscope 160A) is inserted.

The base end side of the endoscope 160A is connected to the operation portion 162 via the cable 161. By operating the operation portion 162, it is possible to capture an image of the internal structure of the clutch housing 30 with the endoscope 160A. The image (for example, the image including the tip end portion 131 of the greasing pipe 130A and its surrounding environment (for example, the corresponding portion C)) taken by the endoscope 160A can be displayed on the display portion 163 attached to the operation portion 162.

Next, the holding member 170 will be described

As illustrated in FIG. 11, the holding member 170 holds the greasing pipe 130A and the endoscope 160A in a state in which the greasing pipe 130A and the endoscope 160A are arranged side by side.

Figure 12:
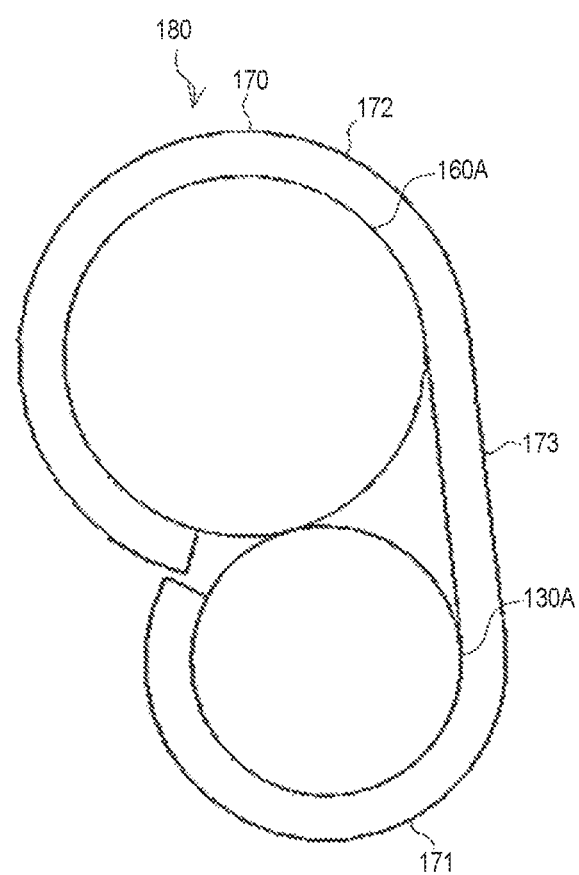
FIG. 12 is a cross-sectional view taken along the line XII-XII of FIG. 11.
Figure 13:
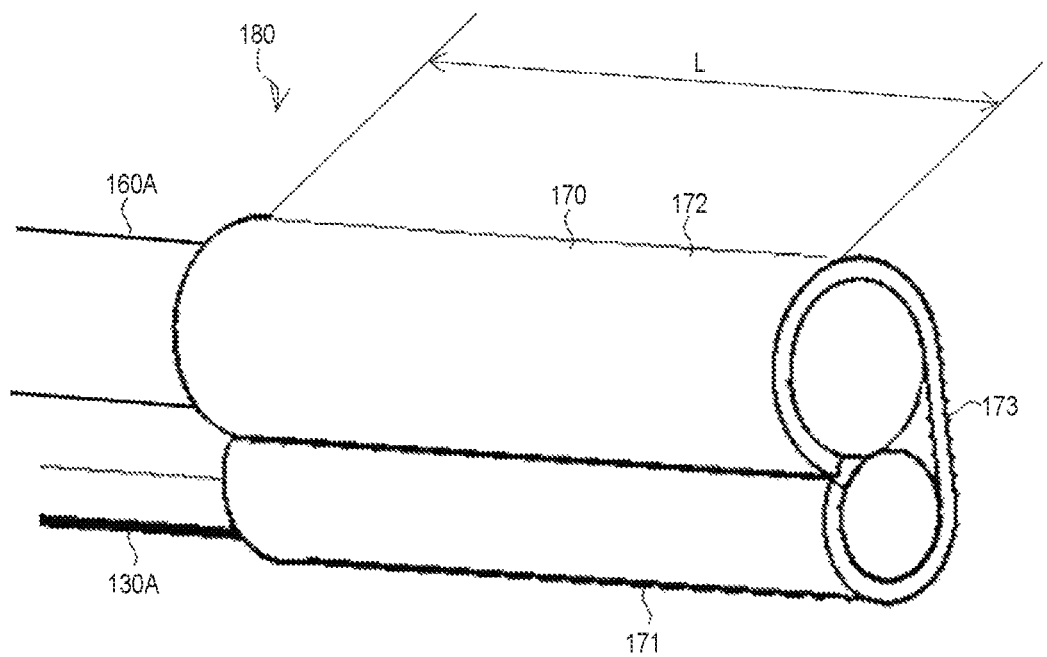
FIG. 13 is a perspective view of a holding member.

FIG. 12 is a cross-sectional view taken along the line XII-XII of FIG. 11, and FIG. 13 is a perspective view of the holding member 170.

As illustrated in FIGS. 12 and 13, the holding member 170 includes an injection-portion insertion portion 171 into which the greasing pipe 130A (cylindrical portion on the base end portion side) is press-fitted, an imaging-unit insertion portion 172 into which the endoscope 160A (cylindrical portion on the base end portion side) is press-fitted, and a first connection portion 173 which connects the injection-portion insertion portion 171 and the imaging-unit insertion portion 172.

The injection-portion insertion portion 171 is a first semi-cylindrical portion into which the greasing pipe 130A (cylindrical portion on the base end portion side) is press-fitted. The imaging-unit insertion portion 172 is a second semi-cylindrical portion into which the endoscope 160A (cylindrical portion on the base end portion side) is press-fitted. The first connection portion 173 is a flat portion connecting one end portion of the first semi-cylindrical portion (injection-portion insertion portion 171) and one end portion of the second semi-cylindrical portion (imaging-unit insertion portion 172). Hereinafter, the first connection portion 173 is also referred to as a flat portion 173. The flat portion (first connection portion 173) extends in a tangential direction of the first semi-cylindrical portion (injection-portion insertion portion 171) and the second semi-cylindrical portion (imaging-unit insertion portion 172) (see FIG. 12).

The first semi-cylindrical portion (injection-portion insertion portion 171) is formed in a state in which a first end portion of the plate is folded back into a semi-cylindrical shape. Similarly, the second semi-cylindrical portion (imaging-unit insertion portion 172) is formed in a state in which a second end portion of the plate is folded back into a semi-cylindrical shape. The first connection portion 173 is a plate portion between the first semi-cylindrical portion (injection portion insertion portion 171) and the second semi-cylindrical portion (imaging unit insertion portion 172).

The holding member 170 (plate) is made of synthetic resin or spring steel. That is, the holding member 170 may be formed by performing injection-molding with a synthetic resin, or may be formed by bending or pressing a plate-shaped spring steel.

An axial length L (see FIG. 13) of the holding member 170 is set to a length (for example, L=40 mm) suitable for fixing the greasing pipe 130A and the endoscope 160A to each other.

The diameter of the injection-portion insertion portion 171 is slightly larger than the diameter of the greasing pipe 130A. Therefore, the injection-portion insertion portion 171 is elastically deformed when the greasing pipe 130A is inserted, and is fixed to the greasing pipe 130A (cylindrical portion on the base end portion side) in a state of being in close contact with the outer peripheral surface of the greasing pipe 130A (cylindrical portion on the base end portion side) due to the restoring force of the injection-portion insertion portion 171.

Similarly, the diameter of the imaging-unit insertion portion 172 is slightly larger than the diameter of the endoscope 160A. Therefore, the imaging-unit insertion portion 172 is elastically deformed when the endoscope 160A is inserted, and is fixed to the endoscope 160A (cylindrical portion on the base end portion side) in a state of being in close contact with the outer peripheral surface of the endoscope 160A (cylindrical portion on the base end portion side) due to the restoring force of the imaging-unit insertion portion 172.

Figure 14:
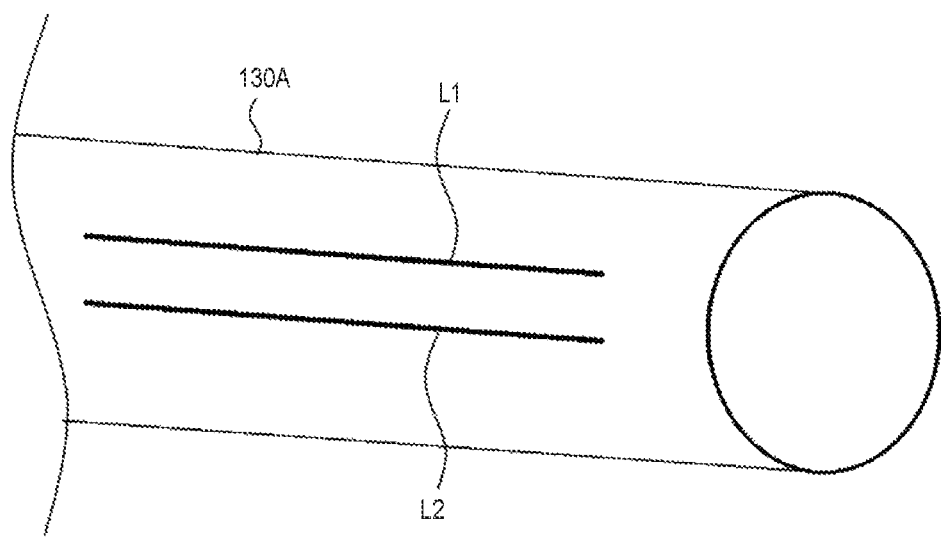
FIG. 14 is a perspective view of a greasing pipe (cylindrical portion on a base end portion side)

FIG. 14 is a perspective view of the greasing pipe 130A (cylindrical portion on the base end portion side).

As illustrated in FIG. 14, the outer peripheral surface of the greasing pipe 130A is provided with a first marking line L1 and a second marking line L2 extending in the axial direction. The marking lines L1, L2 are used to arrange the endoscope 160A at an appropriate angular position with respect to the greasing pipe 130A. This will be described below. The marking lines L1, L2 are examples of the injection portion-side marking of the present disclosure. The injection portion-side marking is not limited to the marking lines L1, L2, and may be other markings such as a line drawn with a magic marker or a sticker and attached to the outer peripheral surface of the greasing pipe 130A.

Figure 15:
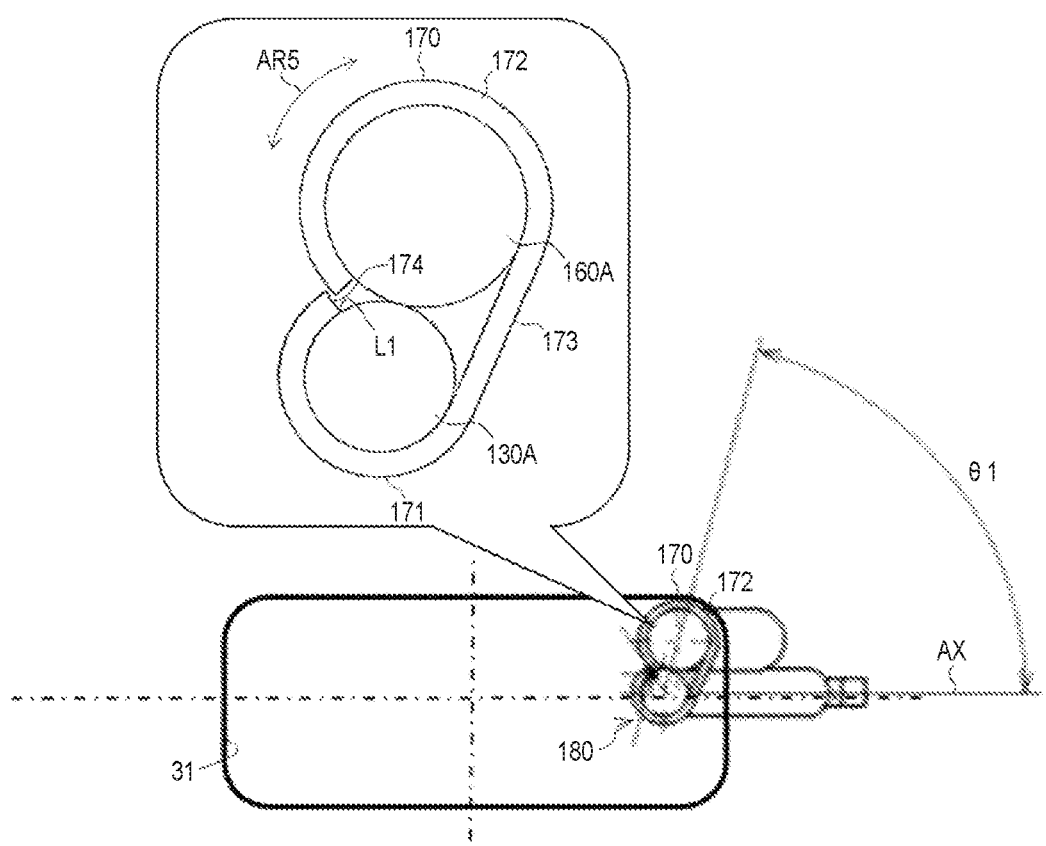
FIG. 15 is a view illustrating a state in which an insertion portion is inserted into the through hole of the clutch housing in order to supply grease to a corresponding portion on a front side.
Figure 16:
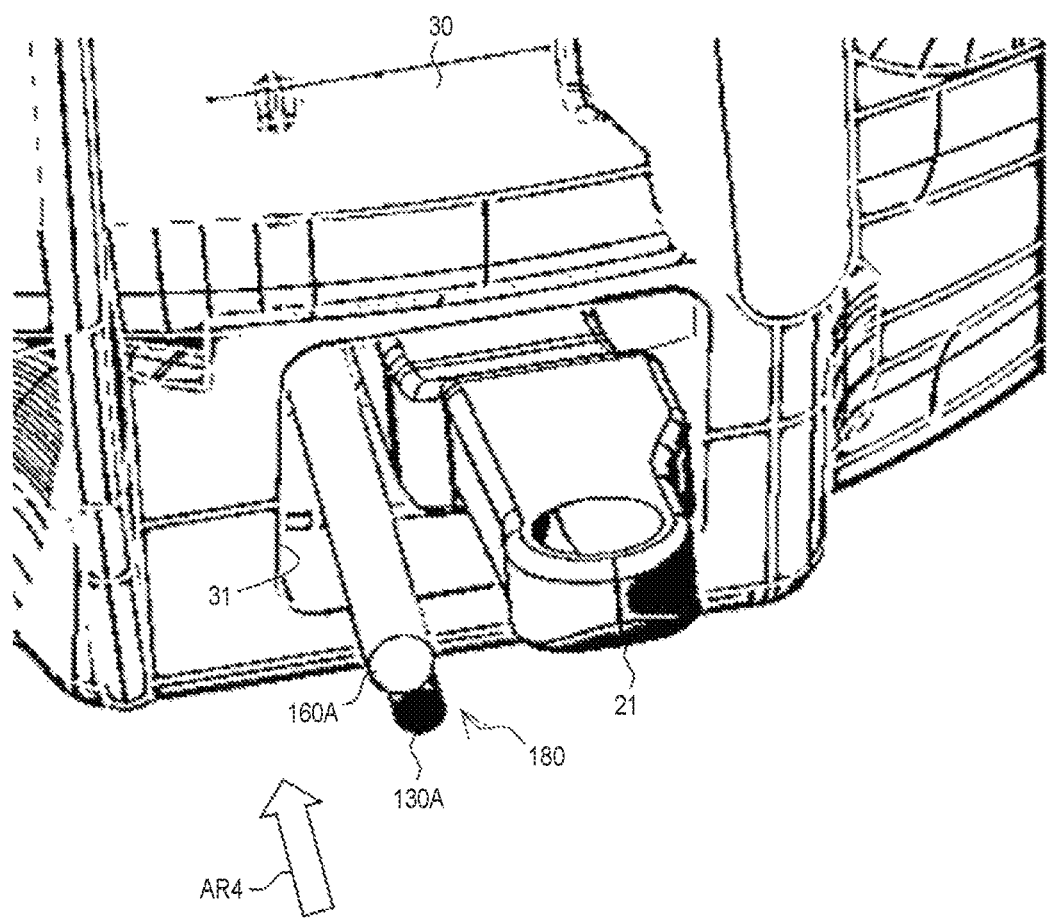
FIG. 16 is a view illustrating a state in which the insertion portion is inserted into the through hole of the clutch housing in order to supply grease to the corresponding portion on the front side.

Next, a greasing method using the injection device 100A will be described with reference to FIGS. 15 to 17. FIGS. 15 and 16 are views illustrating a state in which the insertion portion 180 is inserted into the through hole 31 of the clutch housing 30 in order to supply grease to the corresponding portion C on the front side. FIG. 15 is a view of the through hole 31 seen from a direction opposite to the arrow AR4 in FIG. 17. FIG. 17 is a view illustrating a state in which the greasing pipe 130A extends toward the corresponding portion C on the front side in a state in which the insertion portion 180 is inserted into the through hole 31 of the clutch housing 30.

The fork boot 32 is removed before performing each of the following steps. As a result, the through hole 31 (see FIG. 16 and the like) of the clutch housing 30 for inserting the insertion portion 180 is exposed.

Hereinafter, in FIG. 17, an example of greasing in the order of the corresponding portion C on the front side and the corresponding portion C on the back side will be described. In FIG. 17, the corresponding portion C on the back side is arranged behind the release bearing 15 and is not illustrated.

First, as a first step, to prevent the insertion portion 180 (greasing pipe 130A and endoscope 160A) inserted toward the corresponding portion C on the front side from interfering with obstacles inside the clutch housing 30 (and to secure the field of view of the endoscope 160A), the operator arranges the endoscope 160A at an appropriate angular position with respect to the greasing pipe 130A according to the layout of the internal structure of the clutch housing 30.

This is realized by rotating (see the arrow AR5 in FIG. 15) the holding member 170 with respect to the greasing pipe 130A in a state of holding the greasing pipe 130A and the endoscope 160A, and matching (see FIG. 15) a winding finish end portion 174 on the injection-portion insertion portion 171 side of the holding member 170 with the first marking line L1 (see FIG. 14) attached to the outer peripheral surface of the greasing pipe 130A.

The first marking line L1 is provided at a position where the winding finish end portion 174 on the injection-portion insertion portion 171 side matches the first marking line L1 when the endoscope 160A is arranged at a position of an angle θ1 (see FIG. 15) with respect to the greasing pipe 130A (reference line AX). In the case of FIG. 15, the angle θ1 is, for example, 75°. The winding finish end portion 174 on the injection-portion insertion portion 171 side is an example of the marking on the holding member side of the present disclosure. The marking on the holding member side is not limited to the winding finish end portion 174 on the injection-portion insertion portion 171 side, and may be another marking such as a line drawn with a magic marker or a seal and attached to the holding member 170. The reference line AX extends in a direction parallel to the upper surface (see FIG. 11) of the quadrangular cylindrical tip end portion 131 of the greasing pipe 130A (see FIG. 11).

Therefore, by visually confirming the positional relationship between the winding finish end portion 174 on the injection-portion insertion portion 171 side of the holding member 170 and the first marking line L1, the operator can identify that the endoscope 160A is arranged at the position of the angle θ1 (see FIG. 15) with respect to the greasing pipe 130A (reference line AX).

Next, as a second step, the operator inserts the insertion portion 180 in which the endoscope 160A is arranged at the position of the angle θ1 through the through hole 31 of the clutch housing 30. The through hole 31 of the clutch housing 30 is an example of the "an opening portion or a notch portion formed in a partition wall between the operator and the corresponding portion" of the present disclosure. In this case, as illustrated in FIG. 15, the insertion portion 180 is inserted while making the imaging-unit insertion portion 172 of the holding member 170 come into contact with a corner portion (right corner portion in FIG. 15) corresponding to the corresponding portion C on the front side of the through hole 31 of the clutch housing 30, that is, while guiding the insertion direction of insertion portion 180 toward the corresponding portion C on the front side. As described above, in the first embodiment, the guide function is realized by the corner portion of the through hole 31 of the clutch housing 30 and the imaging-unit insertion portion 172 of the holding member 170.

Figure 18:
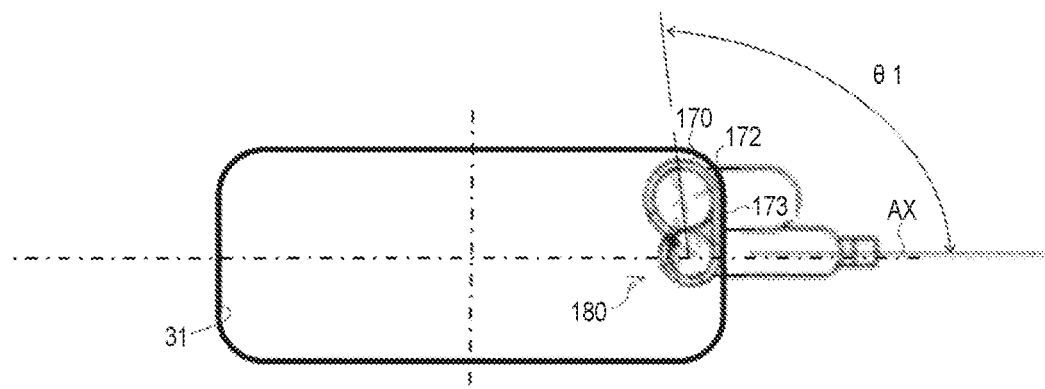
FIG. 18 is a view (modification example) illustrating a state in which the insertion portion is inserted into the through hole of the clutch housing in order to supply grease to the corresponding portion on the front side.

The guide function may be realized as follows. FIG. 18 is a view (modification example) illustrating a state in which the insertion portion 180 is inserted into the through hole 31 of the clutch housing 30 in order to supply grease to the corresponding portion C on the front side. That is, as illustrated in FIG. 18, the insertion portion 180 may be inserted while not only the imaging-unit insertion portion 172 of the holding member 170, but also the flat portion 173 is in contact with the corner portion (right corner portion in FIG. 18) corresponding to the corresponding portion C on the front side of the through hole 31 of the clutch housing 30. This is an example of realizing the guide function by the corner portion of the through hole 31 of the clutch housing 30 and the imaging-unit insertion portion 172 and the flat portion 173 of the holding member 170. In the case of FIG. 18, the angle θ1 is, for example, 100°.

In the following steps, while paying close attention to the screen (image including the tip end portion 131 of the greasing pipe 130A and its surrounding environment (for example, the corresponding portion C on the front side)) displayed on the display portion 163 attached to the operation portion 162 gripped with one hand (for example, the right hand), the operator inserts the insertion portion 180 gripped by the other hand (for example, the left hand) toward the corresponding portion C on the front side in the direction of the arrow AR4 (see FIGS. 16 and 17) so that the tip end portion 131 of the greasing pipe 130A reaches the corresponding portion C on the front side.

Along with the operation of inserting the insertion portion 180 toward the corresponding portion C on the front side, the tip end portion 131 of the greasing pipe 130A eventually reaches a position P4 (see FIG. 17) before a predetermined distance from the corresponding portion C on the front side, and then it reaches a position P3 (see FIG. 17) near the corresponding portion C on the front side.

In this way, in order to visually identify the required insertion amount until the tip end portion 131 of the greasing pipe 130A reaches the position P4 before the predetermined distance from the corresponding portion C and the position P3 near the corresponding portion C, as illustrated in FIG. 11, the holding member 170 is attached with a third marking line L3 and a fourth marking line L4. Instead of the marking lines L3 and L4, a marking such as a line drawn with a magic marker or a sticker may be attached to the holding member 170.

The third marking line L3 is provided at a position where the third marking line L3 matches the through hole 31 of the clutch housing 30 when the tip end portion 131 of the greasing pipe 130A reaches the position P4 (see FIG. 17) before the predetermined distance from the corresponding portion C (when the tip end portion 131 of the greasing pipe 130A and the corresponding portion C have a predetermined positional relationship).

Therefore, by visually confirming the positional relationship between the third marking line L3 and the through hole 31 of the clutch housing 30, the operator can identify the required insertion amount until the tip end portion 131 of the greasing pipe 130A reaches the position P4 (see FIG. 17) before the predetermined distance from the corresponding portion C. Further, it can be identified that the tip end portion 131 of the greasing pipe 130A has reached the position P4 (see FIG. 17) before the predetermined distance from the corresponding portion C.

The fourth marking line L4 is provided at a position where the fourth marking line IA matches the through hole 31 of the clutch housing 30 when the tip end portion 131 of the greasing pipe 130A reaches the position P3 (see FIG. 17) near the corresponding portion C (when the tip end portion 131 of the greasing pipe 130A and the corresponding portion C have a predetermined positional relationship).

Therefore, by visually confirming the positional relationship between the fourth marking line L4 and the through hole 31 of the clutch housing 30, the operator can identify the required insertion amount until the tip end portion 131 of the greasing pipe 130A reaches the position P3 (see FIG. 17) near the corresponding portion C. Further, it can be identified that the tip end portion 131 of the greasing pipe 130A has reached the position P3 (see FIG. 17) near the corresponding portion C.

The third marking line L3 may be omitted.

Next, when the fourth marking line L4 matches the through hole 31 of the clutch housing 30, that is, when the tip end portion 131 of the greasing pipe 130A reaches the position P3 (see FIG. 17) near the corresponding portion C on the front side, as a third step, the operator inserts (see FIG. 17) the tip end portion 131 of the greasing pipe 130A between the clutch release fork 21 (pressing portion 21a) and the release bearing 15, and supplies grease to the corresponding portion C on the front side from the injection port 131a of the greasing pipe 130A. Specifically, while paying close attention to the screen (image including the tip end portion 131 of the greasing pipe 130A and its surrounding environment (for example, the corresponding portion C on the front side)) displayed on the display portion 163 attached to the operation portion 162 grasped by one hand (for example, the right hand), the operator grasps the greasing device 150 with the other hand (for example, the left hand) and operates it (for example, pushing the push rod 152 illustrated in FIG. 11 in the axial direction thereof) to supply grease from the injection port 131a of the greasing pipe 130A to the corresponding portion C (see FIG. 17) on the front side.

Next, when the supply of grease to the corresponding portion C on the front side is completed, as the fourth step, the operator pulls out the greasing pipe 130A from the through hole 31 of the clutch housing 30.

Next, as a fifth step, to prevent the insertion portion 180 (greasing pipe 130A and endoscope 160A) inserted toward the corresponding portion C on the back side from interfering with obstacles inside the clutch housing 30 (and to secure the field of view of the endoscope 160A), the operator arranges the endoscope 160A at an appropriate angular position with respect to the greasing pipe 130A according to the layout of the internal structure of the clutch housing 30.

Figure 19:
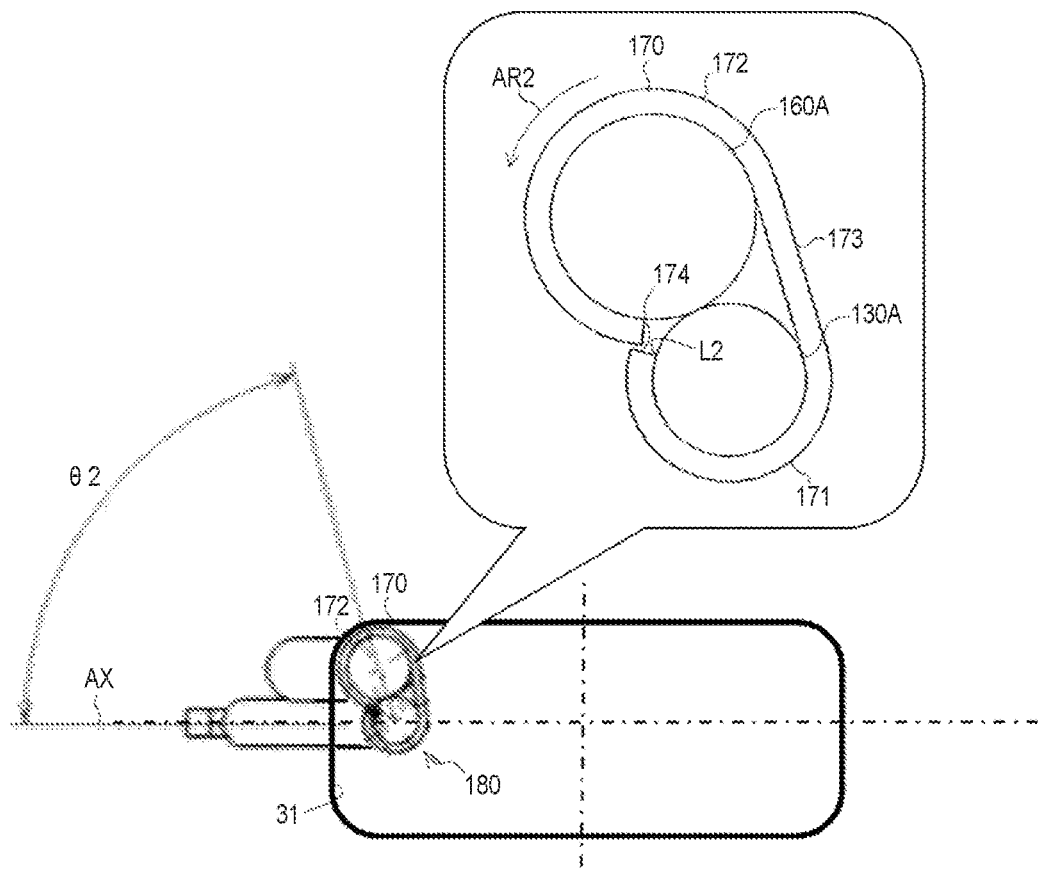
FIG. 19 is a view illustrating a state in which the insertion portion is inserted into the through hole of the clutch housing in order to supply grease to a corresponding portion on a back side.

This is realized by rotating (see the arrow AR2 in FIG. 19) the holding member 170 with respect to the greasing pipe 130A in a state of holding the greasing pipe 130A and the endoscope 160A, and matching (see FIG. 19) the winding finish end portion 174 on the injection-portion insertion portion 171 side of the holding member 170 with the second marking line L2 (see FIG. 14) attached to the outer peripheral surface of the greasing pipe 130A. FIG. 19 is a view illustrating a state in which the insertion portion 180 is inserted into the through hole 31 of the clutch housing 30 in order to supply grease to the corresponding portion C on the back side. FIG. 19 is a view of the through hole 31 seen from the direction opposite to the arrow AR4 in FIG. 17.

The second marking line L2 is provided at a position where the winding finish end portion 174 on the injection-portion insertion portion 171 side of the holding member 170 matches the second marking line L2 when the endoscope 160A is arranged at a position of an angle $\theta 2$ (see FIG. 19) with respect to the greasing pipe 130A (reference line AX). In the case of FIG. 19, the angle $\theta 2$ is, for example, 75°.

Therefore, by visually confirming the positional relationship between the winding finish end portion 174 on the injection-portion insertion portion 171 side of the holding member 170 and the second marking line L2, the operator can identify that the endoscope 160A is arranged at the position of the angle $\theta 2$ (see FIG. 19) with respect to the greasing pipe 130A (reference line AX).

Next, as a sixth step, the operator inserts the insertion portion 180 in which the endoscope 160A is arranged at the position of the angle $\theta 2$ through the through hole 31 of the clutch housing 30. In this case, as illustrated in FIG. 19, the insertion portion 180 is inserted while making the imaging-unit insertion portion 172 of the holding member 170 come into contact with a corner portion (left corner portion in FIG. 19) corresponding to the corresponding portion C on the back side of the through hole 31 of the clutch housing 30, that is, while guiding the insertion direction of insertion portion 180 toward the corresponding portion C on the back side. As described above, in the first embodiment, the guide function is realized by the corner portion of the through hole 31 of the clutch housing 30 and the imaging-unit insertion portion 172 of the holding member 170.

Figure 20:
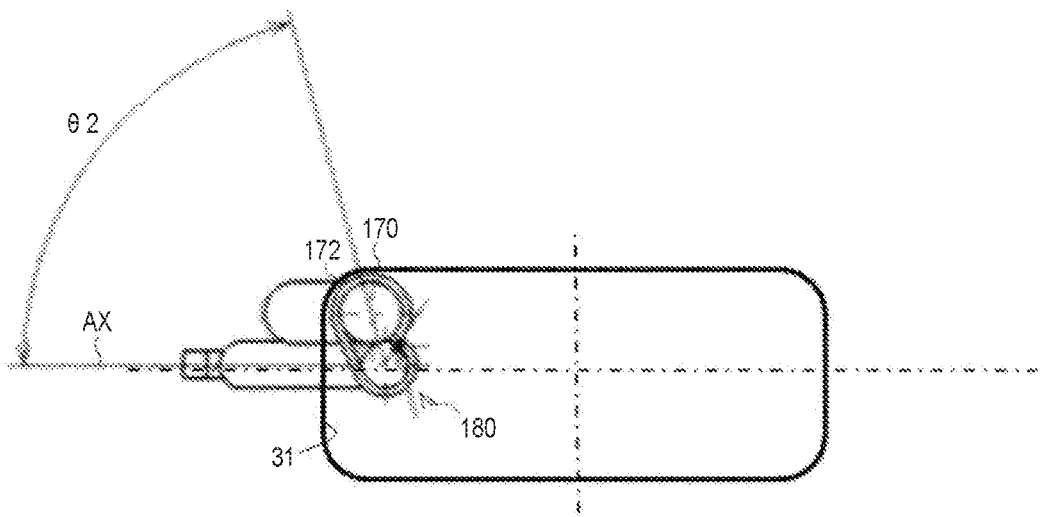
FIG. 20 is a view (modification example) illustrating a state in which the insertion portion is inserted into the through hole of the clutch housing in order to supply grease to the corresponding portion on the back side.

The guide function may be realized as follows. FIG. 20 is a view (modification example) illustrating a state in which the insertion portion 180 is inserted into the through hole 31 of the clutch housing 30 in order to supply grease to the corresponding portion C on the back side. That is, as illustrated in FIG. 20, the insertion portion 180 may be inserted while making the imaging-unit insertion portion 172 of the holding member 170, which is the right-left inverted holding member 170 illustrated in FIG. 15, come into contact with the corner portion (left corner portion in FIG. 20) corresponding to the corresponding portion C on the back side of the through hole 31 of the clutch housing 30. This is realized by executing, between the fourth step and the fifth step, a process of pulling out the greasing pipe 130A and the endoscope 160A from the holding member 170, inverting the holding member 170 right and left, and holding the greasing pipe 130A and the endoscope 160A again with the holding member 170 inverted right and left.

Figure 21:
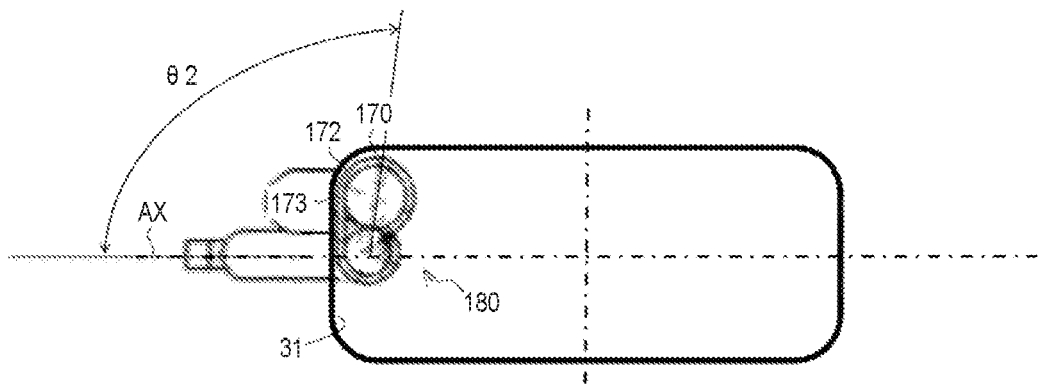
FIG. 21 is a view (modification example) illustrating a state in which the insertion portion is inserted into the through hole of the clutch housing 30 in order to supply grease to the corresponding portion on the back side.

Further, the guide function may be realized as follows. FIG. 21 is a view (modification example) illustrating a state in which the insertion portion 180 is inserted into the through hole 31 of the clutch housing 30 in order to supply grease to the corresponding portion C on the back side. That is, as illustrated in FIG. 21, the insertion portion 180 may be inserted while not only the imaging-unit insertion portion 172 of the holding member 170, but also the flat portion 173 is in contact with the corner portion (left corner portion in FIG. 21) corresponding to the corresponding portion C on the back side of the through hole 31 of the clutch housing 30. This is an example of realizing the guide function by the corner portion of the through hole 31 of the clutch housing 30 and the imaging-unit insertion portion 172 and the flat portion 173 of the holding member 170. In the case of FIG. 21, the angle θ2 is, for example, 100°.

In the following steps, while paying close attention to the screen (image including the tip end portion 131 of the greasing pipe 130A and its surrounding environment (for example, the corresponding portion C on the back side)) displayed on the display portion 163 attached to the operation portion 162 gripped with one hand (for example, the right hand), the operator inserts the insertion portion 180 gripped by the other hand (for example, the left hand) toward the corresponding portion C on the back side so that the tip end portion 131 of the greasing pipe 130A reaches the corresponding portion C on the back side.

Along with the operation of inserting the insertion portion 180 toward the corresponding portion C on the back side, the tip end portion 131 of the greasing pipe 130A eventually reaches the position P4 (see FIG. 17) before the predetermined distance from the corresponding portion C on the back side, and then reaches the position P3 (see FIG. 17) near the corresponding portion C on the back side.

Next, when the fourth marking line L4 matches the through hole 31 of the clutch housing 30, that is, when the tip end portion 131 of the greasing pipe 130A reaches the position P3 (see FIG. 17) near the corresponding portion C on the back side, as a seventh step, the operator inserts the tip end portion 131 of the greasing pipe 130A between the clutch release fork 21 (pressing portion 21a) and the release bearing 15, and supplies grease to the corresponding portion C on the back side from the injection port 131a of the greasing pipe 130A. Specifically, while paying close attention to the screen (image including the tip end portion 131 of the greasing pipe 130A and its surrounding environment (for example, the corresponding portion C on the back side)) displayed on the display portion 163 attached to the operation portion 162 grasped by one hand (for example, the right hand), the operator grasps the greasing device 150 with the other hand (for example, the left hand) and operates it (for example, pushing the push rod 152 illustrated in FIG. 11 in the axial direction thereof) to supply grease from the injection port 131a of the greasing pipe 130A to the corresponding portion C on the back side.

Next, when the supply of grease to the corresponding portion C on the back side is completed, as an eighth step, the operator pulls out the greasing pipe 130A from the through hole 31 of the clutch housing 30.

By executing each of the above steps, greasing on the corresponding portion C on the front side and the corresponding portion C on the back side is completed.

As described above, according to the first embodiment, the insertion portion 180 can be inserted toward the corresponding portion C without using a guide jig.

This is due to the fact that the guide function is realized by the through hole 31 (corner portion, or the like) of the clutch housing 30 and the holding member 170 (imaging-unit insertion portion 172, flat portion 173).

Further, according to the first embodiment, the endoscope 160A can be arranged at an appropriate angular position with respect to the greasing pipe 130A.

This is due to the provision of the holding member 170 that holds the greasing pipe 130A and the endoscope 160A arranged side by side and the provision of the greasing pipe 130A with the injection portion-side marking (for example, the marking lines L1 and L2) that matches the holding member-side marking of the holding member 170 (for example, the winding finish end portion 174 on the injection-portion insertion portion 171 side of the holding member 170).

Further, according to the first embodiment, it is possible to perform greasing on the pressing portion 21a of the clutch release fork 21 without detachment of the clutch housing 30 (or a manual transmission unit including the clutch housing 30) from the vehicle. This facilitates greasing maintenance work and improves workability.

Next, a first modification example of the holding member 170 of the first embodiment will be described.

Figure 22:
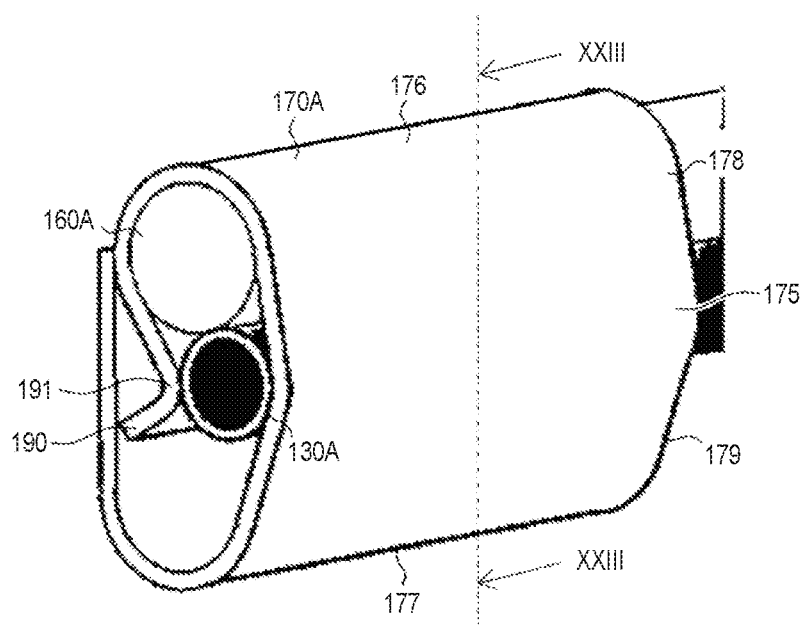
FIG. 22 is a perspective view of a holding member which is a first modification example.
Figure 23:
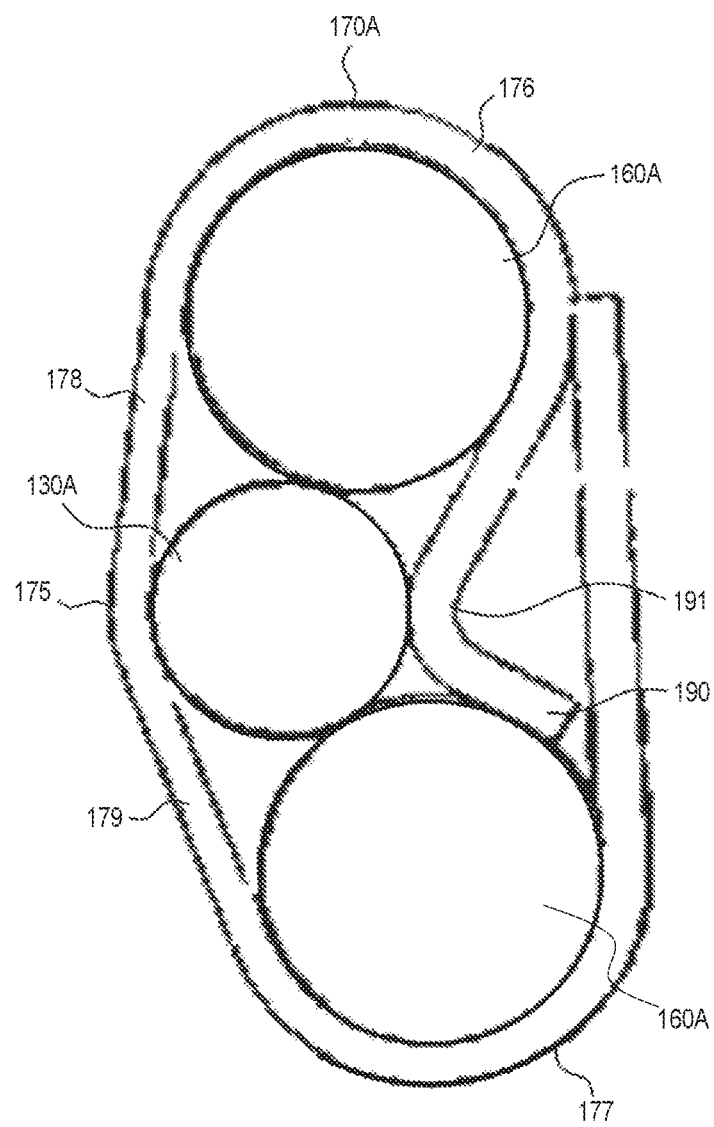
FIG. 23 is a cross-sectional view taken along the line XXIII-XXIII of FIG. 22.

FIG. 22 is a perspective view of a holding member 170A, which is the first modification example, and FIG. 23 is a cross-sectional view taken along the line XXIII-XXIII of FIG. 22.

As illustrated in FIGS. 22 and 23, the holding member 170A includes the third semi-cylindrical portion 175, which is an injection-portion insertion portion into which the greasing pipe 130A (cylindrical portion on the base end portion side) is press-fitted, a fourth semi-cylindrical portion 176 and a fifth semi-cylindrical portion 177, each of which is an imaging-unit insertion portion into which the endoscope 160A (cylindrical portion on the base end portion side) is press-fitted, a second connection portion 178 which connects the third semi-cylindrical portion 175 and the fourth semi-cylindrical portion 176, and a third connection portion 179 which connects the third semi-cylindrical portion 175 and the fifth semi-cylindrical portion 177.

The second connection portion 178 is a flat portion connecting a first end portion of the third semi-cylindrical portion 175 and a first end portion of the fourth semi-cylindrical portion 176. This flat portion (second connection portion 178) extends tangentially to the third semi-cylindrical portion 175 and the fourth semi-cylindrical portion 176 (see FIG. 23).

The third connection portion 179 is a flat portion connecting a second end portion of the third semi-cylindrical portion 175 and a first end portion of the fifth semi-cylindrical portion 177. This flat portion (third connection portion 179) extends tangentially to the third semi-cylindrical portion 175 and the fifth semi-cylindrical portion 177 (see FIG. 23).

The fourth semi-cylindrical portion 176 is formed in a state in which a first end portion of the plate is folded back into a semi-cylindrical shape. Similarly, the fifth semi-cylindrical portion 177 is formed with a second end portion of the plate folded back into a semi-cylindrical shape.

The third semi-cylindrical portion 175 is formed in a plate portion between the fourth semi-cylindrical portion 176 and the fifth semi-cylindrical portion 177.

The second connection portion 178 is a plate portion between the third semi-cylindrical portion 175 and the fourth semi-cylindrical portion 176. The third connection portion 179 is a plate portion between the third semi-cylindrical portion 175 and the fifth semi-cylindrical portion 177.

One end portion (free end portion) of the plate includes a first biasing portion 190, which biases the endo scope 160A (cylindrical portion on the base end portion side) inserted into the fifth semi-cylindrical portion 177 against the fifth semi-cylindrical portion 177, and a second biasing portion 191, which biases the greasing pipe 130A (cylindrical portion on the base end portion side) inserted into the third semi-cylindrical portion 175 against the third semi-cylindrical portion 175.

The third semi-cylindrical portion 175 is fixed to the greasing pipe 130A (cylindrical portion on the base end portion side) inserted into the third semi-cylindrical portion 175. This fixing can be performed by a known means such as an adhesive or welding.

The holding member 170A (plate) is made of synthetic resin or spring steel. That is, the holding member 170A may be formed by performing injection-molding with a synthetic resin, or may be formed by bending or pressing a plate-shaped spring steel.

As described above, according to the first modification example, by press-fitting the endoscope 160A (cylindrical portion on the base end portion side) into the fourth semi-cylindrical portion 176 or the fifth semi-cylindrical portion 177, depending on the layout of the internal structure of the clutch housing 30, the operator can position the endoscope 160A at an appropriate angular position with respect to the greasing pipe 130A. As a result, when inserting the insertion portion 180 (greasing pipe 130A and endoscope 160A) toward the corresponding portion C, it is possible to prevent the insertion portion 180 (greasing pipe 130A and endoscope 160A) from interfering with obstacles inside the clutch housing 30.

Further, according to the first modification example, the second connection portion 178 and the third connection portion 179 are flat portions. Thus, compared with a second modification example described below, in which a fourth connection portion 178B and a fifth connection portion 179B respectively corresponding to the second connection portion 178 and the third connection portion 179 are curved portions, the manufacturing cost (processing cost for bending the second connection portion 178 and the third connection portion 179, or the like) of the holding member 170A can be reduced.

Further, according to the first modification example, by executing the same steps as the first to eighth steps described in the first embodiment, the same effect as that of the first embodiment can be obtained.

Next, the second modification example of the first embodiment will be described.

Figure 24:
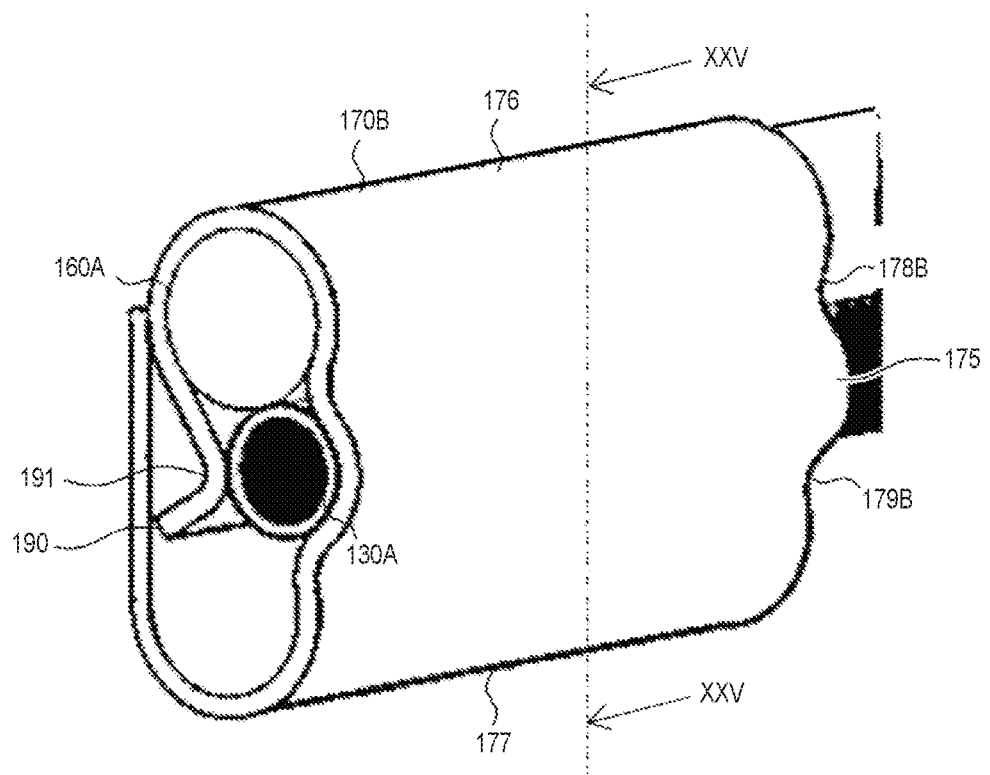
FIG. 24 is a perspective view of a holding member which is a second modification example.
Figure 25:
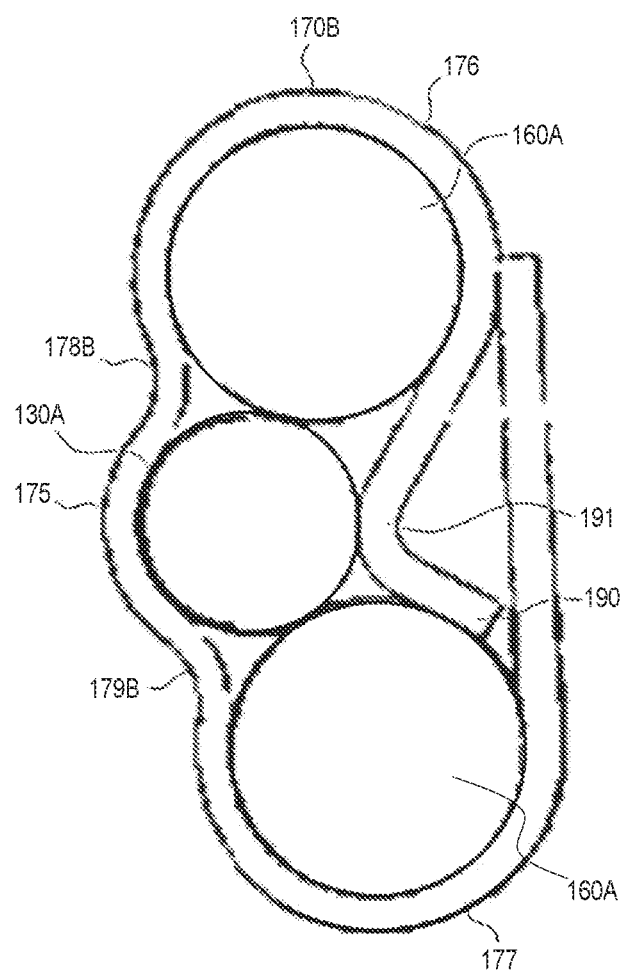
FIG. 25 is a cross-sectional view taken along the line XXV-XXV of FIG. 24.

FIG. 24 is a perspective view of a holding member 170B, which is the second modification example, and FIG. 25 is a cross-sectional view taken along the line XXV-XXV of FIG. 24.

The holding member 170B corresponds to a holding member in which the second connection portion 178, which is the flat portion of the holding member 170A as the first modification example, is replaced with the fourth connection portion 178B which is the curved portion, and the third connection portion 179, which is the flat portion of the holding member 170A as the first modification example, is replaced with the fifth connection portion 179B which is the curved portion. Further, the third semi-cylindrical portion 175 is not fixed to the greasing pipe 130A (cylindrical portion on the base end portion side) inserted in the third semi-cylindrical portion 175. Other than that, the holding member 170B is the same as the holding member 170A which is the first modification example. Hereinafter, the differences from the holding member 170A, which is the first modification example, will be mainly described, and the same reference numerals will be given to the same configurations and the description thereof will be omitted as appropriate.

As illustrated in FIGS. 24 and 25, the holding member 170B includes the third semi-cylindrical portion 175, which is an injection-portion insertion portion into which the greasing pipe 130A (cylindrical portion on the base end portion side) is press-fitted, the fourth semi-cylindrical portion 176 and the fifth semi-cylindrical portion 177, each of which is an imaging-unit insertion portion into which the endoscope 160A (cylindrical portion on the base end portion side) is press-fitted, the fourth connection portion 178B which connects the third semi-cylindrical portion 175 and the fourth semi-cylindrical portion 176, and the fifth connection portion 179B which connects the third semi-cylindrical portion 175 and the fifth semi-cylindrical portion 177.

The fourth connection portion 178B is the curved portion that connects a first end portion of the third semi-cylindrical portion 175 and a first end portion of the fourth semi-cylindrical portion 176.

The fifth connection portion 179B is the curved portion that connects a second end portion of the third semi-cylindrical portion 175 and a first end portion of the fifth semi-cylindrical portion 177.

The fourth connection portion 178B is a plate portion between the third semi-cylindrical portion 175 and the fourth semi-cylindrical portion 176. The fifth connection portion 179B is a plate portion between the third semi-cylindrical portion 175 and the fifth semi-cylindrical portion 177.

The holding member 170B (plate) is made of synthetic resin or spring steel. That is, the holding member 170B may be formed by performing injection-molding with a synthetic resin, or may be formed by bending or pressing a plate-shaped spring steel.

As described above, according to the second modification example, by press-fitting the endoscope 160A (cylindrical portion on the base end portion side) into the fourth semi-cylindrical portion 176 or the fifth semi-cylindrical portion 177, depending on the layout of the internal structure of the clutch housing 30, the operator can position the endoscope 160A at an appropriate angular position with respect to the greasing pipe 130A. As a result, when inserting the insertion portion 180 (greasing pipe 130A and endoscope 160A) toward the corresponding portion C, it is possible to prevent the insertion portion 180 (greasing pipe 130A and endoscope 160A) from interfering with obstacles inside the clutch housing 30.

Further, according to the second modification example, by executing the same steps as the first to eighth steps described in the first embodiment, the same effect as that of the first embodiment can be obtained.

In the first embodiment described above, the example in which grease is used as a fluid substance is described, but the applicable embodiment is not limited thereto. For example, a fluid may be used as the fluid substance. In this case, the corresponding portion C is the portion where the fluid needs to be supplied. Further, as the fluid substance, a fluid substance other than grease and fluid may be used.

Further, in the first embodiment, the example in which the injection device and the insertion direction guide method of the present disclosure are applied to the field of vehicles (grease injection maintenance of the clutch release mechanism) is described, but the applicable embodiment is not limited thereto. For example, the injection device and the insertion direction guide method of the present disclosure may be applied to various fields such as medical fields and the field of semiconductors other than the field of vehicles. For example, in the first embodiment described above, the example in which the partition wall between the operator and the corresponding portion C is the clutch housing 30 is described, but the applicable embodiment is not limited thereto. That is, the partition wall between the operator and the corresponding portion C may be a partition wall according to the field to which the injection device and the insertion direction guide method of the present disclosure are applied. Further, in the first embodiment, the example of inserting the insertion portion 180 toward the corresponding portion C while (that is, while guiding the insertion direction of the insertion portion 180 toward the corresponding portion C) making the insertion portion 180 come into contact with the corner portion of the opening portion (for example, the through hole 31) formed in the partition wall (for example, the clutch housing 30) between the operator and the corresponding portion C is described, but the applicable embodiment is not limited thereto. For example, when a notch portion (not illustrated) is formed in the partition wall between the operator and the corresponding portion C, the insertion portion 180 may be inserted toward the corresponding portion C while (that is, while guiding the insertion direction of the insertion portion 180 toward the corresponding portion C) making the insertion portion 180 come into contact with the corner portion of the notch portion.

All the numerical values illustrated in the above embodiments are examples, and it goes without saying that appropriate numerical values different from these can be used.

Each of the above embodiments is merely an example in every respect. The present disclosure is not to be construed in a limiting manner by the description of the above embodiments. The present disclosure can be practiced in various other forms without departing from its spirit or key features.

What is claimed is:

1. A holding member configured to hold an injection portion and an imaging unit of an insertion portion in a state in which the injection portion and the imaging unit are arranged side by side, the insertion portion being configured to be inserted toward a corresponding portion in a narrow space while being gripped by an operator, and the injection portion having a cylindrical shape and being provided with a fluid substance injection port at a tip end portion, and the imaging unit having a cylindrical shape and being configured to capture an image including the tip end portion of the injection portion and a surrounding environment of the tip end portion, the holding member comprising:
   an injection-portion insertion portion configured such that the injection portion is press-fitted into the injection-portion insertion portion;
   an imaging-unit insertion portion configured such that the imaging unit is press-fitted into the imaging-unit insertion portion; and
   a first connection portion configured to connect the injection-portion insertion portion and the imaging-unit insertion portion, wherein:
   the injection-portion insertion portion is a first semi-cylindrical portion configured such that the injection portion is press-fitted into the injection-portion insertion portion:
   the imaging-unit insertion portion is a second semi-cylindrical portion configured such that the imaging unit is press-fitted into the imaging-unit insertion portion;
   the first semi-cylindrical portion is a portion where first end portion of a plate is folded back into a semi-cylindrical shape;
   the second semi-cylindrical portion is a portion where second end portion of the plate is folded back into a semi-cylindrical shape; and
   the first connection portion is a plate portion between the first semi-cylindrical portion and the second semi-cylindrical portion.

2. The holding member according to claim 1, wherein the first connection portion is a flat portion configured to connect one end portion of the first semi-cylindrical portion and one end portion of the second semi-cylindrical portion.

3. The holding member according to claim 1, further comprising a second connection portion and a third connection portion, wherein:
   the injection-portion insertion portion is a third semi-cylindrical portion configured such that the injection portion is press-fitted into the third semi-cylindrical portion;
   the imaging-unit insertion portion includes a fourth semi-cylindrical portion configured such that the imaging unit is press-fitted into the fourth semi-cylindrical portion and a fifth semi-cylindrical portion configured such that the imaging unit is press-fitted into the fifth semi-cylindrical portion;
   the second connection portion is configured to connect the third semi-cylindrical portion and the fourth semi-cylindrical portion; and
   the third connection portion is configured to connect the third semi-cylindrical portion and the fifth semi-cylindrical portion.

4. The holding member according to claim 3, wherein:
   the second connection portion is a flat portion configured to connect first end portion of the third semi-cylindrical portion and one end portion of the fourth semi-cylindrical portion; and
   the third connection portion is a flat portion configured to connect second end portion of the third semi-cylindrical portion and one end portion of the fifth semi-cylindrical portion.

5. The holding member according to claim 4, wherein the third semi-cylindrical portion is fixed to the injection portion inserted into the third semi-cylindrical portion.

6. The holding member according to claim 3, wherein:
the fourth semi-cylindrical portion is a portion where first end portion of a plate is folded back into a semi-cylindrical shape;
the fifth semi-cylindrical portion is the portion where second end portion of the plate is folded back into a semi-cylindrical shape;
the third semi-cylindrical portion is a plate portion between the fourth semi-cylindrical portion and the fifth semi-cylindrical portion;
the second connection portion is a plate portion between the third semi-cylindrical portion and the fourth semi-cylindrical portion;
the third connection portion is a plate portion between the third semi-cylindrical portion and the fifth semi-cylindrical portion; and
the first end portion of the plate includes a first biasing portion configured to bias the imaging unit inserted into the fifth semi-cylindrical portion against the fifth semi-cylindrical portion and a second biasing portion configured to bias the injection portion inserted into the third semi-cylindrical portion against the third semi-cylindrical portion.

7. The holding member according to claim 1, wherein the plate is made of synthetic resin or spring steel.

8. An injection device comprising:
an insertion portion configured to be inserted toward a corresponding portion in a narrow space while being gripped by an operator, the insertion portion including:
an injection portion which has a cylindrical shape and is provided with a fluid substance injection port at a tip end portion;
an imaging unit which has a cylindrical shape and is configured to capture an image including the tip end portion of the injection portion and a surrounding environment of the tip end portion; and
a holding member configured to hold the injection portion and the imaging unit arranged side by side and including an injection-portion insertion portion and an imaging-unit insertion portion, the injection-portion insertion portion being configured such that the injection portion is press-fitted into the injection-portion insertion portion, and the imaging-unit insertion portion being configured such that the imaging unit is press-fitted into the imaging-unit insertion portion, wherein:
the injection portion is provided with an injection portion-side marking; and
the imaging unit is arranged at a predetermined angular position with respect to the injection portion by rotating the holding member holding the injection portion and the imaging unit with respect to the injection portion and aligning a holding member-side marking of the holding member with the injection portion-side marking.

9. The injection device according to claim 8, wherein the holding member-side marking of the holding member is a winding finish end portion of the holding member.

10. An insertion direction guide method for guiding an insertion direction of an insertion portion, the insertion portion being configured to be inserted toward a corresponding portion in a narrow space while being gripped by an operator and including an injection portion and an imaging unit, the injection portion having a cylindrical shape and being provided with a fluid substance injection port at a tip end portion, the imaging unit having a cylindrical shape and being configured to capture an image including the tip end portion of the injection portion and a surrounding environment of the tip end portion, and the insertion portion being held by a holding member in a state in which the injection portion and the imaging unit are arranged side by side, the insertion direction guide method comprising:
inserting the insertion portion into an opening or a notch portion provided in a partition wall between the operator and the corresponding portion; and
inserting the insertion portion toward the corresponding portion while bringing the holding member of the insertion portion inserted into the opening or the notch portion into contact with at least a corner portion of the opening or the notch portion.

* * * * *